US012572776B2

(12) United States Patent
Yan et al.

(10) Patent No.: US 12,572,776 B2
(45) Date of Patent: Mar. 10, 2026

(54) METHOD, SYSTEM, AND COMPUTER PROGRAM PRODUCT FOR UNIVERSAL DEPTH GRAPH NEURAL NETWORKS

(71) Applicant: Visa International Service Association, San Francisco, CA (US)

(72) Inventors: Yuchen Yan, Urbana, IL (US);
Yuzhong Chen, Foster City, CA (US);
Mahashweta Das, Campbell, CA (US);
Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/115,468

(22) PCT Filed: Sep. 27, 2023

(86) PCT No.: PCT/US2023/033814
§ 371 (c)(1),
(2) Date: Mar. 26, 2025

(87) PCT Pub. No.: WO2024/072856
PCT Pub. Date: Apr. 4, 2024

(65) Prior Publication Data
US 2025/0259033 A1     Aug. 14, 2025

Related U.S. Application Data
(60) Provisional application No. 63/410,437, filed on Sep. 27, 2022.

(51) Int. Cl.
*G06N 3/042* (2023.01)
*G06F 17/16* (2006.01)
(Continued)

(52) U.S. Cl.
CPC ............. *G06N 3/042* (2023.01); *G06F 17/16* (2013.01); *G06N 3/0464* (2023.01); *G06Q 20/4016* (2013.01)

(58) Field of Classification Search
CPC ...... G06N 3/042; G06N 3/0464; G06F 17/16; G06Q 20/4016
See application file for complete search history.

(56) References Cited

U.S. PATENT DOCUMENTS

2018/0122137 A1     5/2018  Tian et al.
2020/0065292 A1     2/2020  Li et al.
(Continued)

OTHER PUBLICATIONS

Wu F, Souza A, Zhang T, Fifty C, Yu T, Weinberger K. Simplifying graph convolutional networks. InInternational conference on machine learning May 2, 20194 (pp. 6861-6871). Pmlr. (Year: 2019).*
(Continued)

*Primary Examiner* — Li B. Zhen
*Assistant Examiner* — Henry Nguyen
(74) *Attorney, Agent, or Firm* — The Webb Law Firm

(57) ABSTRACT

Methods, systems, and computer program products for universal depth graph neural networks may obtain a graph G including an adjacency matrix A and an attribute matrix X and train a graph convolutional network using according to the following updating Equation: $H=\sigma(\hat{S}^d XW)$, where H is an output embedding matrix, $\sigma(\cdot)$ is a nonlinear activation function, $\hat{S}$ is a filter, X is an attribute matrix, W is a trainable weight matrix, and d is a trainable depth parameter.

9 Claims, 12 Drawing Sheets

(51) Int. Cl.
    *G06N 3/0464*      (2023.01)
    *G06Q 20/40*      (2012.01)

(56) References Cited

U.S. PATENT DOCUMENTS

| | | | |
|---|---|---|---|
| 2020/0285944 A1* | 9/2020 | Lee | G06F 18/24 |
| 2021/0256355 A1 | 8/2021 | Chen et al. | |
| 2021/0334822 A1* | 10/2021 | Pati | G06Q 40/08 |

OTHER PUBLICATIONS

Park J, Lee M, Chang HJ, Lee K, Choi JY. Symmetric graph convolutional autoencoder for unsupervised graph representation learning. InProceedings of the IEEE/CVF international conference on computer vision 2019 (pp. 6519-6528). (Year: 2019).*

Bianchi et al., "Graph neural networks with convolutional arma filters", IEEE transactions on pattern analysis and machine intelligence, 2021, pp. 3496-3507, vol. 44, No. 7.

Bo et al., "Beyond low-frequency information in graph convolutional network", In Proceedings of the AAAI conference on artificial intelligence, 2021, pp. 3950-3957, vol. 35, No. 5.

Bojchevski et al., "Deep gaussian embedding of graphs: Unsupervised inductive learning via ranking", arXiv preprint arXiv:1707.03815 (2017).

Bruna et al., "Spectral networks and locally connected networks on graphs", arXiv preprint arXiv:1312.6203 (2013).

Chein et al., "Adaptive universal generalized pagerank graph neural network", arXiv preprint arXiv:2006.07988 (2020).

Chen et al., "Neural ordinary differential equations", Advances in neural information processing systems, 2018, vol. 31, pp. 1-13.

Chen et al., "Supervised community detection with line graph neural networks", arXiv preprint arXiv:1705.08415 (2017).

Chung, "Spectral graph theory", American Mathematical Soc., 1997, vol. 92.

Defferrard et al., "Convolutional neural networks on graphs with fast localized spectral filtering", Advances in neural information processing systems, 2016, pp. 1-9, vol. 29.

Fey et al., "Fast graph representation learning with PyTorch Geometric", arXiv preprint arXiv:1903.02428 (2019).

Gasteiger et al., "Predict then propagate: Graph neural networks meet personalized pagerank", arXiv preprint arXiv:1810.05997 (2018).

Hamilton et al., "Inductive representation learning on large graphs", Advances in neural information processing systems, 2017, pp. 1-11, vol. 30.

He et al., "Bernnet: Learning arbitrary graph spectral filters via bernstein approximation", Advances in Neural Information Processing Systems 2021, pp. 14239-14251, vol. 34.

He et al., "Deep residual learning for image recognition", In Proceedings of the IEEE conference on computer vision and pattern recognition, 2016, pp. 770-778.

Huang et al., "Adaptive sampling towards fast graph representation learning", Advances in neural information processing systems, 2018, pp. 1-10, vol. 31.

Kipf et al., "Semi-supervised classification with graph convolutional networks", arXiv preprint arXiv:1609.02907 (2016).

Krizhevsky et al., "Imagenet classification with deep convolutional neural networks", Advances in neural information processing systems 25 (2012).

Lehoucq, et al., "ARPACK users' guide: solution of large-scale eigenvalue problems with implicitly restarted Arnoldi methods", Society for Industrial and Applied Mathematics, 1998.

Li et al., "Deeper insights into graph convolutional networks for semi-supervised learning", In Proceedings of the AAAI conference on artificial intelligence, 2018, pp. 3538-3545, vol. 32, No. 1.

Li et al., "Deepgens: Can gens go as deep as cnns?", In Proceedings of the IEEE/CVF international conference on computer vision, 2019, pp. 9267-9276.

Lim et al., "Large scale learning on non-homophilous graphs: New benchmarks and strong simple methods", Advances in Neural Information Processing Systems, 2021, pp. 20887-20902, vol. 34.

Medvedev, "The nonlinear heat equation on dense graphs and graph limits", SIAM Journal on Mathematical Analysis, 2014, pp. 2743-2766, vol. 46, No. 4.

Monti et al., "Geometric deep learning on graphs and manifolds using mixture model cnns", In Proceedings of the IEEE conference on computer vision and pattern recognition, 2017, pp. 5115-5124.

Pei et al., "Geom-gcn: Geometric graph convolutional networks", arXiv preprint arXiv:2002.05287 (2020).

Qiu et al., "Network embedding as matrix factorization: Unifying deepwalk, line, pte, and node2vec", In Proceedings of the eleventh ACM international conference on web search and data mining, 2018, pp. 459-467.

Rong et al., "Dropedge: Towards deep graph convolutional networks on node classification", arXiv preprint arXiv:1907.10903 (2019).

Rozemberczki et al., "Multi-scale attributed node embedding", Journal of Complex Networks 2021, pp. 1-22, vol. 9, No. 2.

Shah et al., "Functional Calculus", BoD—Books on Demand, 2020.

Shuman et al., "The emerging field of signal processing on graphs: Extending high-dimensional data analysis to networks and other irregular domains", IEEE signal processing magazine, 2013, pp. 83-98, vol. 30, No. 3.

Tong et al., "Fast random walk with restart and its applications", In Sixth international conference on data mining (ICDM'06), IEEE, 2006, pp. 613-622.

Veličković et al., "Graph attention networks", arXiv preprint arXiv:1710.10903 (2017).

Wang et al., "Dissecting the diffusion process in linear graph convolutional networks", Advances in Neural Information Processing Systems, 2021, pp. 5758-5769, vol. 34.

Wang et al., "How powerful are spectral graph neural networks", In International conference on machine learning, PMLR, 2022, pp. 23341-23362.

Wu et al., "Net: Degree-specific graph neural networks for node and graph classification", In Proceedings of the 25th ACM SIGKDD international conference on knowledge discovery & data mining, 2019, pp. 406-415.

Wu et al., "Simplifying graph convolutional networks", In International conference on machine learning, PMLR, 2019, pp. 6861-6871.

Xhonneux et al., "Continuous graph neural networks", In International conference on machine learning, PMLR, 2020, pp. 10432-10441.

Xu et al., "Representation learning on graphs with jumping knowledge networks", In International conference on machine learning, PMLR, 2018, pp. 5453-5462.

Zhang et al., "Heterogeneous graph neural network", In Proceedings of the 25th ACM SIGKDD international conference on knowledge discovery & data mining, 2019, pp. 793-803.

Zhang, Muhan, and Yixin Chen. "Link prediction based on graph neural networks", Advances in neural information processing systems, 2018, vol. 31.

Zhao et al., "Pairnorm: Tackling oversmoothing in gnns", arXiv preprint arXiv:1909.12223 (2019).

Zheng et al., "Deeper-GXX: deepening arbitrary GNNs", arXiv preprint arXiv:2110.13798 (2021).

Zheng et al., "Graph neural networks for graphs with heterophily: A survey", arXiv preprint arXiv:2202.07082 (2022).

Zhu et al., "Beyond homophily in graph neural networks: Current limitations and effective designs", Advances in neural information processing systems, 2020, pp. 7793-7804, vol. 33.

Zhu et al., "Graph neural networks with heterophily", In Proceedings of the AAAI conference on artificial intelligence, 2021, pp. 11168-11176, vol. 35, No. 12.

Mesgaran et al., "Graph Fairing Convolutional Networks for Anomaly Detection", Pattern Recognition, p. 109960, 1 vol. 145.

* cited by examiner

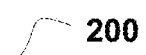
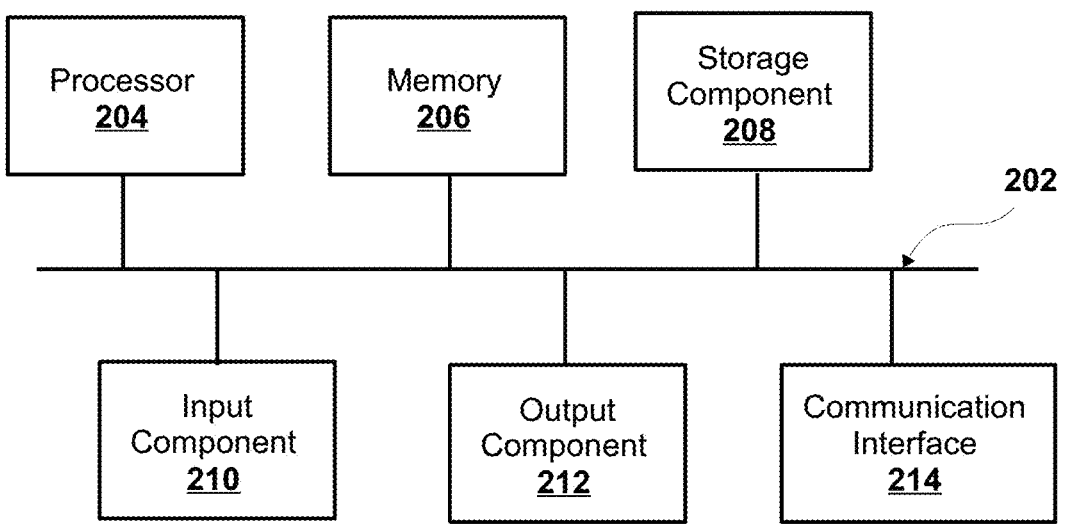
FIG. 2

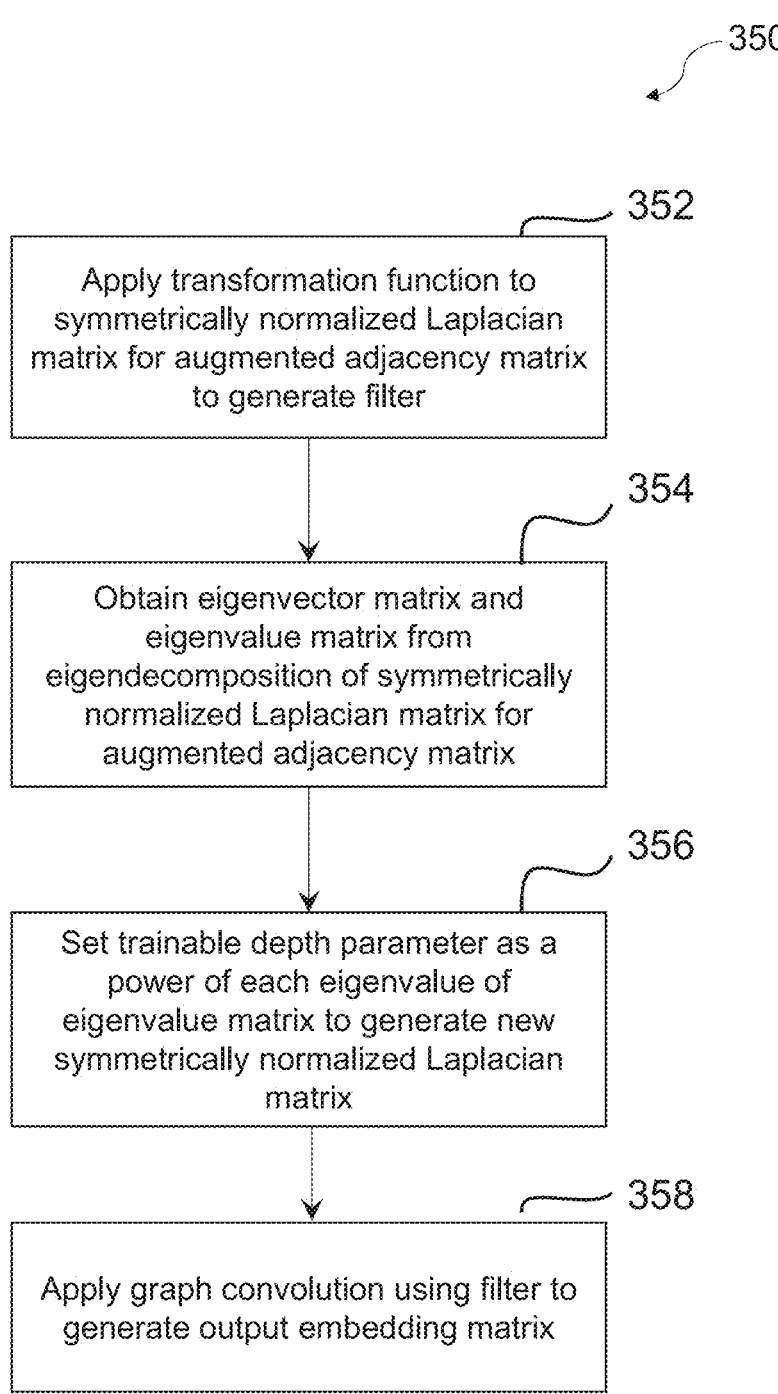

350

352

Apply transformation function to symmetrically normalized Laplacian matrix for augmented adjacency matrix to generate filter

354

Obtain eigenvector matrix and eigenvalue matrix from eigendecomposition of symmetrically normalized Laplacian matrix for augmented adjacency matrix

356

Set trainable depth parameter as a power of each eigenvalue of eigenvalue matrix to generate new symmetrically normalized Laplacian matrix

358

Apply graph convolution using filter to generate output embedding matrix

FIG. 3B

TABLE 1: PERFORMANCE COMPARISON (MEAN ± STD ACCURACY) ON HOMOPHILIC GRAPHS

| DATSETS | CORA | CITESEER | PUBMED | DBLP |
|---|---|---|---|---|
| GCN | 80.8 ±0.8 | 70.5 ±0.6 | 78.8 ±0.6 | 84.1 ±0.2 |
| SGC | 80.9 ±0.4 | 70.8 ±0.8 | 79.6 ±0.4 | 84.1 ±0.2 |
| APPNP | 81.0 ±1.0 | 71.9 ±0.4 | 79.3 ±0.2 | 83.0 ±0.5 |
| GPRGNN | 82.0 ±0.7 | 69.3 ±0.9 | 78.6 ±0.7 | 84.5 ±0.3 |
| FAGCN | 80.3 ±0.4 | 71.7 ±0.8 | 78.5 ±0.9 | 82.4 ±0.7 |
| H2GCN | 78.8 ±1.0 | 70.5 ±1.0 | 77.9 ±0.3 | 82.4 ±0.3 |
| CHEBNET | 78.8 ±0.5 | 71.1 ±0.4 | 78.1 ±0.8 | 83.1 ±0.1 |
| RED-GCN-S | 82.5 ±1.1 | 70.8 ±0.7 | 79.2 ±0.2 | 84.7 ±0.3 |
| RED-GCN-D | 82.4 ±0.7 | 70.6 ±0.6 | 77.9 ±0.3 | 84.2 ±0.2 |

TABLE 2: PERFORMANCE COMPARISON (MEAN ± STD ACCURACY) ON HETEROPHILIC GRAPHS

| DATSETS | TEXAS | CORNELL | WISCONSIN | ACTOR | SQUIRREL | CHAMELEON | CORNELL5 |
|---|---|---|---|---|---|---|---|
| GCN | 55.9 ±3.4 | 44.3 ±4.4 | 51.4 ±2.2 | 27.5 ±0.5 | 35.8 ±1.3 | 55.2 ±1.8 | 67.9 ±0.2 |
| SGC | 58.7 ±3.1 | 43.8 ±4.4 | 47.3 ±2.1 | 28.0 ±0.8 | 37.2 ±1.8 | 55.3 ±1.0 | 67.4 ±0.5 |
| APPNP | 55.1 ±3.7 | 51.5 ±2.4 | 58.0 ±3.1 | 32.8 ±0.8 | 29.5 ±0.934 | 46.7 ±0.8 | 68.3 ±0.5 |
| GPRGNN | 61.3 ±5.8 | 53.3 ±4.6 | 71.0 ±4.8 | 33.6 ±0.4 | 34.1 ±1.0 | 55.0 ±3.9 | 67.3 ±0.3 |
| FAGCN | 60.2 ±7.8 | 54.8 ±7.4 | 60.1 ±5.2 | 32.2 ±0.5 | 31.2 ±1.6 | 50.4 ±1.9 | 68.3 ±0.7 |
| H2GCN | 68.8 ±6.5 | 61.4 ±4.4 | 69.9 ±5.3 | 33.9 ±0.3 | 30.4 ±0.9 | 48.8 ±1.9 | 68.4 ±0.2 |
| CHEBNET | 76.2 ±2.9 | 66.7 ±3.9 | 75.4 ±3.5 | 34.3 ±0.5 | 31.8 ±0.5 | 49.6 ±1.8 | OOM |
| RED-GCN-S | 77.6 ±5.9 | 72.0 ±5.8 | 82.0 ±2.6 | 35.3 ±0.7 | 38.2 ±1.2 | 55.7 ±1.3 | 68.5 ±0.4 |
| RED-GCN-D | 77.1 ±2.5 | 72.0 ±2.8 | 81.5 ±2.4 | 27.6 ±0.8 | 44.2 ±0.9 | 56.9 ±0.9 | 70.0 ±0.2 |

FIG. 7

| DATASETS | TEXAS | CORNELL | WISCONSIN |
|----------|-------|---------|-----------|
| GCN | 55.9 | 44.3 | 51.4 |
| ReD – GCN - S | 77.6 | 72.0 | 82.0 |
| ReD – GCN - D | 77.1 | 72.0 | 81.5 |
| GCN ($\hat{S}^d$) | 75.9 | 72.7 | 83.4 |

METHOD, SYSTEM, AND COMPUTER PROGRAM PRODUCT FOR UNIVERSAL DEPTH GRAPH NEURAL NETWORKS

CROSS REFERENCE TO RELATED APPLICATIONS

This application is the United States national phase of International Application No. PCT/US23/33814 filed Sep. 27, 2023, and claims priority to U.S. Provisional Patent Application No. 63/410,437, filed Sep. 27, 2022, the disclosures of which are hereby incorporated by reference in their entireties.

BACKGROUND

1. Technical Field

This disclosure relates to graph neural networks and, in some non-limiting embodiments or aspects, to methods, systems, and computer program products to understand a depth of graph neural networks.

2. Technical Considerations

Existing graph neural networks (GNNs) may be designed with fixed integer layers, which may limit a performance of GNNs. In addition, existing GNNs may depend on the homophily assumption, and heterophilic graphs may remain a challenge for GNNs.

SUMMARY

Accordingly, provided are improved systems, devices, products, apparatus, and/or methods for universal depth graph neural networks.

According to some non-limiting embodiments or aspects, provided is a method, including: obtaining, with at least one processor, a graph G including an adjacency matrix A and an attribute matrix X, wherein an augmented adjacency matrix $\tilde{A}$ is determined based on the adjacency matrix A and an identity matrix I, wherein a symmetrically normalized Laplacian matrix $L_{sym}$ for the augmented adjacency matrix $\tilde{A}$ is determined based on the augmented adjacency matrix $\tilde{A}$, the identity matrix I, and a degree matrix D of the adjacency matrix X, and wherein an eigendecomposition of the symmetrically normalized Laplacian matrix $L_{sym}$ for the augmented adjacency matrix $\tilde{A}$ provides an eigenvector matrix U and an eigenvalue matrix $\wedge$; and training, with the at least one processor, a graph convolutional network, by: applying, with the at least one processor, a transformation function to the symmetrically normalized Laplacian matrix $L_{sym}$ for the augmented adjacency matrix $\tilde{A}$ to generate a filter $\hat{S}$; obtaining, with the at least one processor, the eigenvector matrix U and the eigenvalue matrix $\wedge$ from the eigendecomposition of the symmetrically normalized Laplacian matrix $L_{sym}$ for the augmented adjacency matrix $\tilde{A}$; setting, with the at least one processor, a trainable depth parameter d as a power of each eigenvalue of the eigenvalue matrix $\wedge$ of the symmetrically normalized Laplacian matrix $L_{sym}$ to generate a new symmetrically normalized Laplacian matrix $\hat{S}^d$; and applying, with the at least one processor, a graph convolution using the filter $\hat{S}^d$ to generate an output embedding matrix H.

In some non-limiting embodiments or aspects, the graph convolution is applied according to the following updating Equation:

$$H=\sigma(\hat{S}^d XW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

In some non-limiting embodiments or aspects, the trainable depth parameter d includes a first trainable depth parameter $d_h$ and a second trainable depth parameter $d_l$, and wherein the graph convolution is applied according to the following updating Equation:

$$H=\sigma(\hat{S}_{dual}(d_l,d_h,K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

In some non-limiting embodiments or aspects, the method further comprises: processing, with the at least one processor, using a machine learning classifier, the output embedding matrix H to generate at least one predicted label for at least one node of the graph G.

In some non-limiting embodiments or aspects, the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

In some non-limiting embodiments or aspects, the at least one predicted label for the at least one node of the graph G includes a prediction of whether at least one account associated with the at least one node is a malicious account.

According to some non-limiting embodiments or aspects, provided is a system, including: at least one processor programmed and/or configured to: obtain a graph G including an adjacency matrix A and an attribute matrix X, wherein an augmented adjacency matrix $\tilde{A}$ is determined based on the adjacency matrix A and an identity matrix I, wherein a symmetrically normalized Laplacian matrix $L_{sym}$ for the augmented adjacency matrix $\tilde{A}$ is determined based on the augmented adjacency matrix $\tilde{A}$, the identity matrix I, and a degree matrix D of the adjacency matrix X, and wherein an eigendecomposition of the symmetrically normalized Laplacian matrix $L_{sym}$ for the augmented adjacency matrix $\tilde{A}$ provides an eigenvector matrix U and an eigenvalue matrix $\wedge$; and train a graph convolutional network, by: applying a transformation function to the symmetrically normalized Laplacian matrix $L_{sym}$ for the augmented adjacency matrix $\tilde{A}$ to generate a filter $\hat{S}$; obtaining the eigenvector matrix U and the eigenvalue matrix $\wedge$ from the eigendecomposition of the symmetrically normalized Laplacian matrix $L_{sym}$ for the augmented adjacency matrix $\tilde{A}$; setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $\hat{S}^d$; and applying a graph convolution using the filter $\hat{S}^d$ to generate an output embedding matrix H.

In some non-limiting embodiments or aspects, the graph convolution is applied according to the following updating Equation:

$$H=\sigma(\hat{S}^d XW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

In some non-limiting embodiments or aspects, the trainable depth parameter d includes a first trainable depth parameter $d_h$ and a second trainable depth parameter $d_l$, and wherein the graph convolution is applied according to the following updating Equation:

$$H = \sigma(\hat{S}_{dual}(d_l, d_h, K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

In some non-limiting embodiments or aspects, the at least one processor is further programmed and/or configured to: process using a machine learning classifier, the output embedding matrix H to generate at least one predicted label for at least one node of the graph G.

In some non-limiting embodiments or aspects, the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

In some non-limiting embodiments or aspects, the at least one predicted label for the at least one node of the graph G includes a prediction of whether at least one account associated with the at least one node is a malicious account.

According to some non-limiting embodiments or aspects, provided is a computer program product including a non-transitory computer readable medium including program instructions which, when executed by at least one processor, cause the at least one processor to: obtain a graph G including an adjacency matrix A and an attribute matrix X, wherein an augmented adjacency matrix $\tilde{A}$ is determined based on the adjacency matrix A and an identity matrix I, wherein a symmetrically normalized Laplacian matrix $L_{sym}$ for the augmented adjacency matrix $\tilde{A}$ is determined based on the augmented adjacency matrix $\tilde{A}$, the identity matrix I, and a degree matrix D of the adjacency matrix X, and wherein an eigendecomposition of the symmetrically normalized Laplacian matrix $L_{sym}$ for the augmented adjacency matrix $\tilde{A}$ provides an eigenvector matrix U and an eigenvalue matrix $\wedge$; and train a graph convolutional network, by: applying a transformation function to the symmetrically normalized Laplacian matrix $L_{sym}$ for the augmented adjacency matrix $\tilde{A}$ to generate a filter $\hat{S}$; obtaining the eigenvector matrix U and the eigenvalue matrix $\wedge$ from the eigendecomposition of the symmetrically normalized Laplacian matrix $L_{sym}$ for the augmented adjacency matrix $\tilde{A}$; setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$; and applying a graph convolution using the filter $\hat{S}^d$ to generate an output embedding matrix H.

In some non-limiting embodiments or aspects, the graph convolution is applied according to the following updating Equation:

$$H = \sigma(\hat{S}^d XW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

In some non-limiting embodiments or aspects, the trainable depth parameter d includes a first trainable depth parameter $d_h$ and a second trainable depth parameter $d_l$, and wherein the graph convolution is applied according to the following updating Equation:

$$H = \sigma(\hat{S}_{dual}(d_l, d_h, K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

In some non-limiting embodiments or aspects, the program instructions which, when executed by at least one processor, further cause the at least one processor to: process using a machine learning classifier, the output embedding matrix H to generate at least one predicted label for at least one node of the graph G.

In some non-limiting embodiments or aspects, the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

In some non-limiting embodiments or aspects, the at least one predicted label for the at least one node of the graph G includes a prediction of whether at least one account associated with the at least one node is a malicious account.

Further non-limiting embodiments or aspects are set forth in the following numbered clauses:

Clause 1: A method, comprising: obtaining, with at least one processor, a graph G including an adjacency matrix A and an attribute matrix X, wherein an augmented adjacency matrix $\tilde{A}$ is determined based on the adjacency matrix A and an identity matrix I, wherein a symmetrically normalized Laplacian matrix $L_{sym}$ for the augmented adjacency matrix $\tilde{A}$ is determined based on the augmented adjacency matrix $\tilde{A}$, the identity matrix I, and a degree matrix D of the adjacency matrix X, and wherein an eigendecomposition of the symmetrically normalized Laplacian matrix $L_{sym}$ for the augmented adjacency matrix $\tilde{A}$ provides an eigenvector matrix U and an eigenvalue matrix $\wedge$; and training, with the at least one processor, a graph convolutional network, by: applying, with the at least one processor, a transformation function to the symmetrically normalized Laplacian matrix $L_{sym}$ for the augmented adjacency matrix $\tilde{A}$ to generate a filter $\hat{S}$; obtaining, with the at least one processor, the eigenvector matrix U and the eigenvalue matrix $\wedge$ from the eigendecomposition of the symmetrically normalized Laplacian matrix $L_{sym}$ for the augmented adjacency matrix $\tilde{A}$; setting, with the at least one processor, a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$; and applying, with the at least one processor, a graph convolution using the filter $\hat{S}^d$ to generate an output embedding matrix H.

Clause 2: The method of clause 1, wherein the graph convolution is applied according to the following updating Equation:

$$H = \sigma(\hat{S}^d XW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

Clause 3: The method of any of clauses 1 or 2, wherein the trainable depth parameter d includes a first trainable depth parameter $d_h$ and a second trainable depth parameter $d_l$, and wherein the graph convolution is applied according to the following updating Equation:

$$H=\sigma(\hat{S}_{dual}(d_l,d_h,K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

Clause 4: The method of any of clauses 1-3, further comprising: processing, with the at least one processor, using a machine learning classifier, the output embedding matrix H to generate at least one predicted label for at least one node of the graph G.

Clause 5: The method of any of clauses 1-4, wherein the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

Clause 6: The method of any of clauses 1-5, wherein the at least one predicted label for the at least one node of the graph G includes a prediction of whether at least one account associated with the at least one node is a malicious account.

Clause 7: A system, comprising: at least one processor programmed and/or configured to: obtain a graph G including an adjacency matrix A and an attribute matrix X, wherein an augmented adjacency matrix Ã is determined based on the adjacency matrix A and an identity matrix I, wherein a symmetrically normalized Laplacian matrix $L_{sym}$ for the augmented adjacency matrix Ã is determined based on the augmented adjacency matrix Ã, the identity matrix I, and a degree matrix D of the adjacency matrix X, and wherein an eigendecomposition of the symmetrically normalized Laplacian matrix $L_{sym}$ for the augmented adjacency matrix Ã provides an eigenvector matrix U and an eigenvalue matrix $\wedge$; and train a graph convolutional network, by: applying a transformation function to the symmetrically normalized Laplacian matrix $L_{sym}$ for the augmented adjacency matrix Ã to generate a filter Ŝ; obtaining the eigenvector matrix U and the eigenvalue matrix $\wedge$ from the eigendecomposition of the symmetrically normalized Laplacian matrix $L_{sym}$ for the augmented adjacency matrix Ã; setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$; and applying a graph convolution using the filter $\hat{S}^d$ to generate an output embedding matrix H.

Clause 8: The system of clause 7, wherein the graph convolution is applied according to the following updating Equation:

$$H=\sigma(\hat{S}^dXW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

Clause 9: The system of any of clauses 7 or 8, wherein the trainable depth parameter d includes a first trainable depth parameter $d_h$ and a second trainable depth parameter $d_l$, and wherein the graph convolution is applied according to the following updating Equation:

$$H=\sigma(\hat{S}_{dual}(d_l,d_h,K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

Clause 10: The system of any of clauses 7-9, wherein the at least one processor is further programmed and/or configured to: process using a machine learning classifier, the output embedding matrix H to generate at least one predicted label for at least one node of the graph G.

Clause 11: The system of any of clauses 7-10, wherein the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

Clause 12: The system of any of clauses 7-11, wherein the at least one predicted label for the at least one node of the graph G includes a prediction of whether at least one account associated with the at least one node is a malicious account.

Clause 13: A computer program product including a non-transitory computer readable medium including program instructions which, when executed by at least one processor, cause the at least one processor to: obtain a graph G including an adjacency matrix A and an attribute matrix X, wherein an augmented adjacency matrix Ã is determined based on the adjacency matrix A and an identity matrix I, wherein a symmetrically normalized Laplacian matrix $L_{sym}$ for the augmented adjacency matrix Ã is determined based on the augmented adjacency matrix Ã, the identity matrix I, and a degree matrix D of the adjacency matrix X, and wherein an eigendecomposition of the symmetrically normalized Laplacian matrix $L_{sym}$ for the augmented adjacency matrix Ã provides an eigenvector matrix U and an eigenvalue matrix $\wedge$; and train a graph convolutional network, by: applying a transformation function to the symmetrically normalized Laplacian matrix $L_{sym}$ for the augmented adjacency matrix Ã to generate a filter Ŝ; obtaining the eigenvector matrix U and the eigenvalue matrix $\wedge$ from the eigendecomposition of the symmetrically normalized Laplacian matrix $L_{sym}$ for the augmented adjacency matrix Ã; setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$; and applying a graph convolution using the filter $\hat{S}^d$ to generate an output embedding matrix H.

Clause 14: The computer program product of clause 13, wherein the graph convolution is applied according to the following updating Equation:

$$H=\sigma(\hat{S}^dXW)$$

where H is the output embedding matrix, $\sigma(\cdot)$ is a non-linear activation function, $\hat{S}$ is the filter, X is the attribute matrix, W is a trainable weight matrix, and d is the trainable depth parameter.

Clause 15: The computer program product of any of clauses 13 or 14, wherein the trainable depth parameter d includes a first trainable depth parameter $d_h$ and a second trainable depth parameter $d_l$, and wherein the graph convolution is applied according to the following updating Equation:

$$H=\sigma(\hat{S}_{dual}(d_l,d_h,K)XW)$$

where H is the output embedding matrix, $\sigma(\cdot)$ is a non-linear activation function, $\hat{S}$ is the filter, X is the attribute matrix, W is a trainable weight matrix, and K is a hyperparameter.

Clause 16: The computer program product of any of clauses 13-15, wherein the program instructions which, when executed by at least one processor, further cause the at least one processor to: process using a machine learning classifier, the output embedding matrix H to generate at least one predicted label for at least one node of the graph G.

Clause 17: The computer program product of any of clauses 13-16, wherein the graph G includes a plurality of edges and a plurality of nodes for the plurality of edges, wherein the plurality of nodes is associated with a plurality of accounts in an electronic payment network, and wherein the plurality of edges is associated with a plurality of transactions between the plurality of accounts in the electronic payment network.

Clause 18: The computer program product of any of clauses 13-17, wherein the at least one predicted label for the at least one node of the graph G includes a prediction of whether at least one account associated with the at least one node is a malicious account.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS AND APPENDICES

Additional advantages and details are explained in greater detail below with reference to the exemplary embodiments that are illustrated in the accompanying schematic figures, in which:

FIG. 2 is a diagram of non-limiting embodiments or aspects of components of one or more devices and/or one or more systems of FIG. 1;

FIG. 3B is a flowchart of non-limiting embodiments or aspects of a process for universal depth graph neural networks;

FIG. 7 is tables showing semi-supervised node classification performances on homophilic graphs and heterophilic graphs;

FIG. 9 is a table showing performance of a one-layer conventional GCN over an augmented diffusion matrix;

DESCRIPTION

Figure 1:
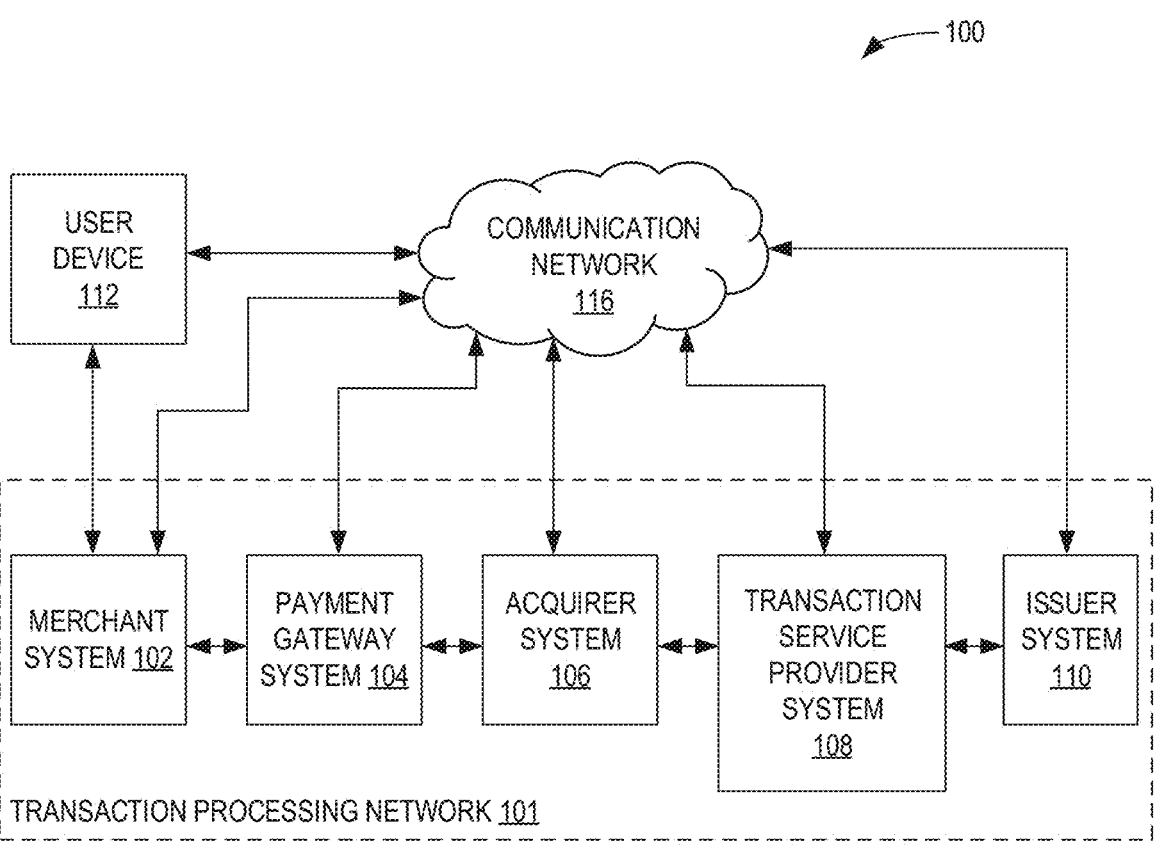
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein, the term "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices and/or components of such (e.g., processors, servers, client devices, software applications, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.)

Graph convolutional network (GCN) has exhibited great power in a variety of graph learning tasks, such as node classification, community detection, and the like. Because the representation power of GCN is largely determined by its depth (e.g., the number of graph convolution layers, etc.) tremendous research efforts have been made on finding the optimal depth that strengthens the model's ability for downstream tasks. Upon increasing the depth, an over-smoothing issue arises: a GCN's performance is deteriorated if its depth exceeds an uncertain threshold. It has been unveiled that a graph convolution operation is a special form of Laplacian smoothing. Thus, the similarity between the graph node embeddings grows with the depth so that these embeddings eventually become indistinguishable. Various techniques have been developed to alleviate this issue, for example, applying pairwise normalization can make distant nodes dissimilar, and dropping sampled edges during training slows down the growth of embedding smoothness as depth increases.

Other than the over-smoothing issue due to large GCN depth, another fundamental phenomenon widely existing in real-world graphs is homophily and heterophily. In a homophilic graph, nodes with similar labels or attributes tend to interconnect, while in a heterophily graph, connected nodes usually have distinct labels or dissimilar attributes. Many graph neural networks (GNNs) are developed based on homophilic assumption, while models able to perform well on heterophilic graphs often need special treatment and complex designs. Despite the achievements made by these methodologies, little correlation has been found between the adopted GNN model's depth and its capability of characterizing graph heterophily.

For many GNNs, if not all, the depth is manually set as a hyper-parameter before training, and finding the proper depth usually requires a considerable amount of trials or good prior knowledge of the graph dataset. Because the depth represents the number of graph convolution operations and naturally takes only positive integer values, little attention has been paid to the question of whether a non-integer depth is realizable, and if yes, whether a non-integer depth is practically meaningful, and whether a non-integer depth can bring unique advantages to current graph learning mechanisms.

Non-limiting embodiments or aspects of the present disclosure may revisit the GCN depth from spectral and spatial perspectives and explain inter-dependencies between the following ingredients in graph learning: the depth of a GCN, the spectrum of the graph signal, and the homophily/heterophily of the underlying graph. Firstly, through eigen-decomposition of the symmetrically normalized graph Laplacian, non-limiting embodiments or aspects of the present disclosure may present a correlation between graph homophily/heterophily and the eigenvector frequencies. Secondly, by introducing the concept of eigengraph, non-limiting embodiments or aspects of the present disclosure may show that the graph topology is equivalent to a weighted linear combination of eigengraphs, and the weight values determine the GCN's capability of capturing homophilic/heterophilic graph signals. Thirdly, non-limiting embodiments or aspects of the present disclosure may reveal that the eigengraph weights can be controlled by GCN's depth, such that an automatically tunable depth parameter is needed to adjust the eigengraph weights into the designated distribution in match of the underlying graph homophily/heterophily.

Non-limiting embodiments or aspects of the present disclosure may provide methods, systems, and/or computer program products that obtain a graph G including an adjacency matrix A and an attribute matrix X, wherein an augmented adjacency matrix Ã is determined based on the adjacency matrix A and an identity matrix I, wherein a symmetrically normalized Laplacian matrix $L_{sym}$ for the augmented adjacency matrix Ã is determined based on the augmented adjacency matrix Ã, the identity matrix I, and a degree matrix D of the adjacency matrix X, and wherein an eigendecomposition of the symmetrically normalized Laplacian matrix $L_{sym}$ for the augmented adjacency matrix Ã provides an eigenvector matrix U and an eigenvalue matrix $\wedge$; and train a graph convolutional network, by: applying a transformation function to the symmetrically normalized Laplacian matrix $L_{sym}$ for the augmented adjacency matrix Ã to generate a filter Ŝ; obtaining the eigenvector matrix U and the eigenvalue matrix $\wedge$ from the eigendecomposition of the symmetrically normalized Laplacian matrix $L_{sym}$ for the augmented adjacency matrix Ã; setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$; and applying a graph convolution using the filter Ŝd to generate an output embedding matrix H. For example, the graph convolution is applied according to the following updating Equation: $H = \sigma(\hat{S}^d XW)$, where H is the output embedding matrix, $\sigma(\cdot)$ is a nonlinear activation function, Ŝ is the filter, X is the attribute matrix, W is a trainable weight matrix, and d is the trainable depth parameter.

In this way, non-limiting embodiments or aspects of the present disclosure may realize an adaptive GCN depth by extending its definition from a positive integer to an arbitrary real number with theoretical feasibility guarantees from functional calculus. With a trainable depth parameter, non-limiting embodiments or aspects of the present disclosure may provide a simple and powerful model, e.g., a Redefined Depth-GCN (ReD-GCN), with two variants (e.g., RED-GCN-S and RED-GCN-D, etc.). For example, non-limiting embodiments or aspects of the present disclosure may conduct an eigenvalue-decomposition of a normalized adjacency matrix to get a basis matrix and an eigenvalue matrix, add a depth parameter as a power of the eigenvalue matrix to construct a new adjacency matrix, and multiply the new trainable adjacency matrix with a given feature matrix for downstream tasks. Accordingly, non-limiting embodiments or aspects of the present disclosure may extend a depth of GNNs from the integer domain to the real number domain and search for a best depth and/or automatically detect a heterophilic/homophilic characteristic of a given graph. For example, if the depth parameter is less than 0, the input graph may be a heterophilic graph. Otherwise, the input graph may be a homophilic graph.

Extensive experiments described herein demonstrate an automatically optimal depth searching ability, and it is found that negative-valued depth plays a role in handling heterophilic graphs. Systematical investigation on the optimal depth is conducted in both spectral and spatial domains, which in turn provides for a novel graph augmentation methodology with clear geometric explainability that possesses supreme advantages over a raw input topology, especially for graphs with heterophily.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 116. Transaction processing network 101, merchant system 102, payment gateway system 104, acquirer system 106, transaction service provider system 108, issuer system 110, and/or user device 112, may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 116, etc.) and/or communicating information and/or data to payment gateway system 104, acquirer system 106, transaction service provider system 108, issuer system 110, and/or user device 112 (e.g., via communication network 116, etc.). Merchant system 102 may include a device capable of receiving information and/or data from user device 112 via a communication connection (e.g., an NFC communication connection, an RFID communication connection, a Bluetooth® communication connection, etc.) with user device 112 and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 116, etc.) and/or communicating information and/or data to merchant system 102, acquirer system 106, transaction service provider system 108, issuer system 110, and/or user device 112 (e.g., via communication network 116, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 116, etc.) and/or communicating information and/or data to merchant system 102, payment gateway system 104, transaction service provider system 108, issuer system 110, and/or user device 112 (e.g., via communication network 116, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 116, etc.) and/or communicating information and/or data to merchant system 102, payment gateway system 104, acquirer system 106, issuer system 110, and/or user device 112 (e.g., via communication network 116, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 (e.g., via communication network 116, etc.) and/or communicating information and/or data to merchant system 102, payment gateway system 104, acquirer system 106, transaction service provider system 108, and/or user device 112 (e.g., via communication network 116 etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 116, etc.) and/or communicating information and/or data to merchant system 102, payment gateway system 104, acquirer system 106, transaction service provider system 108, and/or issuer system 110 (e.g., via communication network 116, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, an issuer bank application, and/or the like) stored and/or executed on user device 112. In some non-limiting embodiments or aspects, user device 112 may be associated with a sender account and/or a receiving account in a payment network for one or more transactions in the payment network.

Communication network 116 may include one or more wired and/or wireless networks. For example, communication network 116 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1.

Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 (e.g., a central processing unit (CPU), a graphics processing unit (GPU), etc.) executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices. The term "programmed to" and/or "configured to," as used herein, may refer to an arrangement of software, device(s), and/or hardware for performing and/or enabling one or more functions (e.g., actions, processes, steps of a process, and/or the like). For example, "a processor programmed and/or configured to" may refer to a processor that executes software instructions (e.g., program code) that cause the processor to perform one or more functions.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
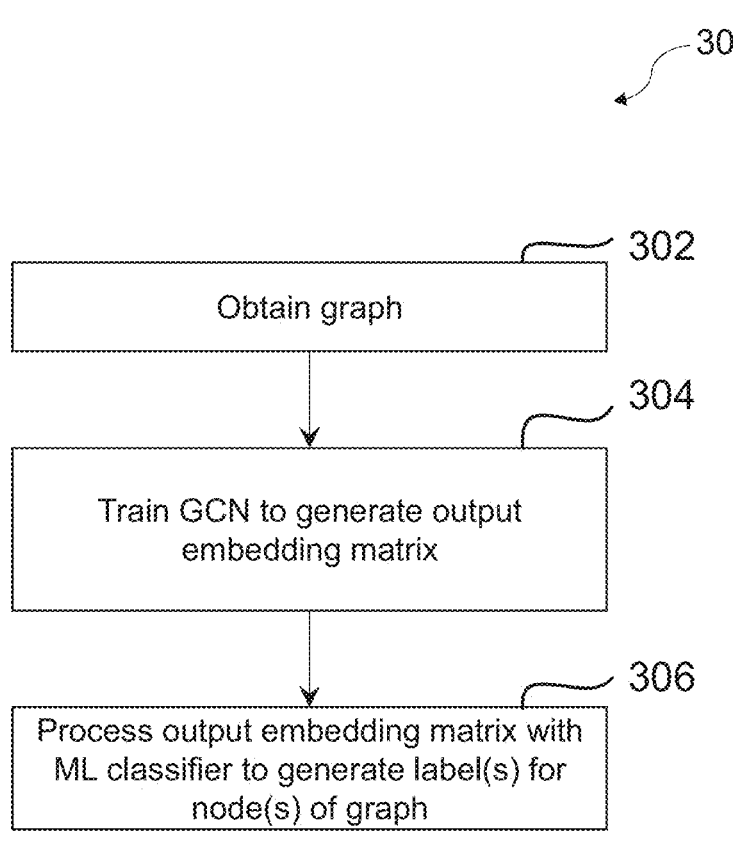
FIG. 3A is a flowchart of non-limiting embodiments or aspects of a process for universal depth graph neural networks.

Referring now to FIG. 3A, FIG. 3A is a flowchart of non-limiting embodiments or aspects of a process 300 for target label concentration based ordinal encoding. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3A, at step 302, process 300 includes obtaining a graph including an adjacency matrix and an attribute matrix. For example, transaction service provider system 108 may obtain a graph G including an adjacency matrix A and an attribute matrix X. An augmented adjacency matrix $\tilde{A}$ may be determined based on the adjacency matrix A and an identity matrix I. A symmetrically normalized Laplacian matrix $L_{sym}$ for the augmented adjacency matrix $\tilde{A}$ may be determined based on the augmented adjacency matrix $\tilde{A}$, the identity matrix I, and a degree matrix D of the adjacency matrix X. An eigendecomposition of the symmetrically normalized Laplacian matrix $L_{sym}$ for the augmented adjacency matrix $\tilde{A}$ may provide an eigenvector matrix U and an eigenvalue matrix $\wedge$.

For example, it is noted that the present disclosure may use bold uppercase letters for matrices (e.g., A), bold lowercase letters for column vectors (e.g., u), and lowercase letters for scalars (e.g., $\alpha$). The superscript T may be used for transpose of matrices and vectors (e.g., $A^T$ and $u^T$). An attributed undirected graph G={A, X} contains an adjacency matrix $A \in \mathbb{R}^{n \times n}$ and an attribute matrix $X \in \mathbb{R}^{n \times q}$ with the number of nodes n and the dimension of node attributes q. D denotes the diagonal degree matrix of A. The adjacency matrix with self-loops is given by $\tilde{A}=A+I$ (I is the identity matrix), and all variables derived from $\tilde{A}$ are decorated with symbol ^, e.g., $\tilde{D}$ represents the diagonal degree matrix of $\tilde{A}$ $M^d$ stands for the d-th power of matrix M, while the parameter and node embedding matrices in the d-th layer of a GCN are denoted by $W^{(d)}$ and $H^{(d)}$.

In some non-limiting embodiments or aspects, the graph G includes a plurality of edges and a plurality of nodes for the plurality of edges. The plurality of nodes may be associated with a plurality of accounts in an electronic payment network. The plurality of edges may be associated with a plurality of transactions between the plurality of accounts in the electronic payment network.

The layer-wise message-passing and aggregation of a GCN may be defined according to the following Equation (1):

$$H^{(d+1)} = \sigma\left(\tilde{D}^{-\frac{1}{2}} \tilde{A} \tilde{D}^{-\frac{1}{2}} H^{(d)} W^{(d)}\right) \tag{1}$$

where $H^{(d)}/H^{(d+1)}$ stands for the embedding matrix ($H^{(0)}$ =X) in the d-th/(d+1)-th layer; $W^{(d)}$ is the trainable parameter matrix; and $\sigma(\cdot)$ is the non-linear activation function. With $\sigma(\cdot)$ removed in each layer, a simplified graph convolutional (SGC) may be obtained according to the following Equation (2):

$$H^{(d)} = \tilde{S}^d X W \tag{2}$$

where $\tilde{S}=\tilde{D}^{-1} \tilde{A} \tilde{D}^{-1}$, and the parameter of each layer $W^{(i)}$ are compressed into one trainable $W=\Pi_{i=0}^{d-1} W^{(i)}$

20

In graph theory, graph Laplacian $L^-=D-A$ and its symmetrically normalized correspondence $L_{sym}=I-D^{-1/2}AD^{-1/2}$ possess properties of the underlying graph G. $L_{sym}$ has eigenvalues $[\lambda_1, \lambda_2, \ldots, \lambda_n]$, where $\lambda_i \in [0, 2)$, $\forall_i \in \{1, 2, \ldots, n\}$. Here the eigenvalues may be placed in ascending order: $0=\lambda_1 \leq \lambda_2 \leq \ldots \leq \lambda_n <2$, which can be eigen-decomposed as: $L_{sym}=U \wedge U^T$, where $U=[u_1, u_2, \ldots, u_n]$ is the eigenvector matrix ($u_i \perp u_j$, $\forall_i = j$), and A is the diagonal eigenvalue matrix defined according to the following Equation (3):

$$\Lambda = \begin{bmatrix} \lambda_1 & \cdots & 0 \\ \vdots & \ddots & \vdots \\ 0 & \cdots & \lambda_n \end{bmatrix}. \tag{3}$$

For each eigenvector $u_i$, there is $u_i u_i^T \in \mathbb{R}^{n \times n}$. As described herein below, this n×n matrix can be viewed as a weighted adjacency matrix of a graph with possible negative edges, which may be referred to as $u_i u_i^T$ as the i-th eigengraph of G. Accordingly, $L_{sym}$ can be written as the linear combination of all eigengraphs weighted by the corresponding eigenvalues according to the following Equation (4):

$$L_{sym} = \lambda_1 u_1 u_1^T + \ldots + \lambda_i u_i u_i^T + \ldots + \lambda_n u_n u_n^T \tag{4}$$

where the first eigenvalue $\pi_1=0$, and the corresponding eigengraph $u_1 u_1^T$ has an identical value 1/n for all entries. Thus, the SGC may be defined according to the following Equation (5):

$$\tilde{S} = I - \tilde{L}_{sym} = \tilde{U}(I - \tilde{\Lambda})\tilde{U}^T = \sum_{i=0}^{n}(1 - \tilde{\lambda}_i)\tilde{u}_i\tilde{u}_i^T \tag{5}$$

A SGC with d layers may use d consecutive graph convolution operations, which involves the multiplication of $\tilde{S}$ by d times. Due to the orthogonality of $\tilde{U}$, namely, $\tilde{U}^T\tilde{U}=I$, the SGC may be defined according to the following Equation (6):

$$\tilde{S}^d = \tilde{U}(I - \tilde{\Lambda})\tilde{U}^T \tilde{U}(I - \tilde{\Lambda})\tilde{U}^T \ldots \tilde{U}(I - \tilde{\Lambda})\tilde{U}^T = \tag{6}$$

$$\tilde{U}(I - \tilde{\Lambda})^d \tilde{U}^T = \sum_{i=1}^{n}(1 - \tilde{\lambda}_i)^d \tilde{u}_i\tilde{u}_i^T$$

where $1-\tilde{\lambda}i \in (-1, 1]$, and the depth d of SGC serves as the power of $\tilde{S}$'s eigenvalues. $\tilde{S}^d$ can be viewed as the sum of eigengraphs $\tilde{u}_i\tilde{u}_i^T$ weighted by coefficients $(1-\tilde{\lambda}_i)^d$. Graph homophily describes to what extent edges tend to link nodes with the same labels and similar features. Non-limiting embodiments or aspects of the present disclosure may focus on edge homophily:

$$h(\mathcal{G}) = \frac{\sum_{i,j,A[i,j]=1} \langle y[i] = y[j] \rangle}{\sum_{i,j} A[i,j]} \in [0, 1],$$

where $\langle x \rangle =1$ if x is true and 0 otherwise. A graph is more homophilic for h(G) closer to 1 or more heterophilic for h(G) closer to 0.

As shown in FIG. 3A, at step 304, process 300 includes training a GCN. For example, transaction service provider system 108 may train a GCN. Further details regarding step 304 of process 300 are provided below with respect to FIG. 3B.

Intrinsic connections between eigengraphs with small/large weights, graph signals with high/low frequencies, and graphs with homophilic/heterophilic properties may be established. The positive/negative depth d of a GCN may be shown to affect the eigengraph weights and in turn determines the algorithm's expressive power to process homophilic/heterophilic graph signals. With the help of functional calculus the theoretical feasibility of extending the domain of d from $\mathbb{N}+$ to $\mathbb{R}$ may be presented. By making d a trainable parameter, non-limiting embodiments or aspects of a model, e.g., RED-GCN and its variants, may be provided, which is capable of automatically detecting the homophily/heterophily of the input graph and finding the corresponding optimal depth.

Figure 4:
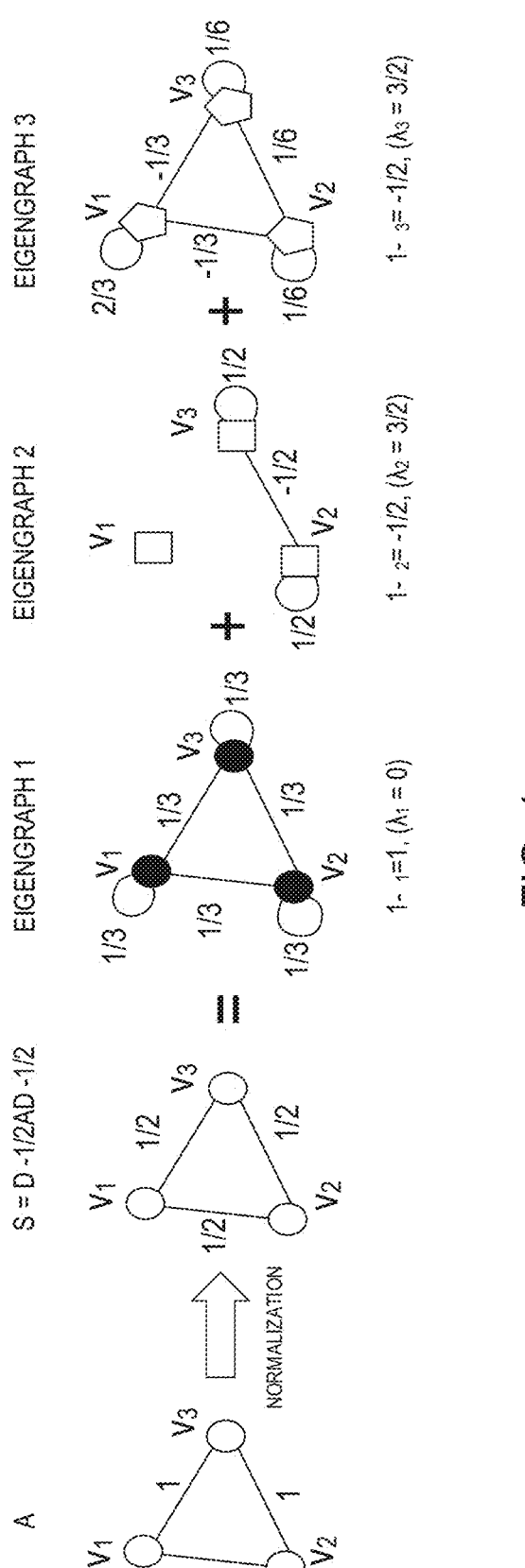
FIG. 4 illustrates a decomposition of an example symmetrically normalized adjacency matrix into three eigengraphs.

The eigenvectors of a graph Laplacian form a complete set of basis vectors in the n-dimensional space capable of expressing the original node attribute X as a linear combination. From the perspective of graph spectrum analysis, the frequency of eigenvector $u_i$ reflects how much the j-th entry $u_i[j]$ deviates from the k-th entry $u_i[k]$ for each connected node pair $v_j$ and $v_k$ in G. This deviation is measured by the set of zero crossings of $u_i$: $Z(u_i):=\{e=(v_j, v_k)\in\varepsilon: u_i[j]u_i[k]<0\}$, where $\varepsilon$ is the set of edges in graph G. Larger/smaller $/Z(u_i)/$ indicates higher/lower eigenvector frequency. A zero-crossing also corresponds a negative weighted edge in an eigengraph. Due to the widely existing positive correlation between $\lambda_i$ and $/Z(u_i)/$, large/small eigenvalues mostly correspond to the high/low frequencies of the related eigenvectors. As shown in FIG. 4, for a toy example of n=3, for $\lambda_1=0$, $/Z(u_1)/=0$, and eigengraph $u_1u_1^T$ is well-connected with identical edge weight 1/n; negative edge weights exist in the 2nd and $3^{rd}$ eigengraphs, indicating more zero crossings ($/Z(u_2)/=1$ and$/Z(u_3)/=2$) and higher eigenvector frequencies.

Because node labels correlate with their attributes, and node attribute similarities indicate the extent of smoothness/homophily, plus node attributes can be expressed by eigenvectors, the deviation between eigenvector entry pairs naturally implies the extent of heterophily. Apparently, high frequency eigenvectors and their corresponding eigengraphs have an advantage on capturing graph heterophily. High frequency eigengraphs should accordingly take larger weights when modeling heterophilic graphs, while low frequency ones should carry larger weights when dealing with homophilic graphs. In turn, eigengraph weights are controlled by the GCN/SGC's depth d (e.g., for a SGC of depth d, the weight of the i-th eigengraph is $(1-\lambda^-_i)^d$, etc.) and changing the layer d of SGC adjusts the weights of different eigengraphs. Therefore, depth d controls the model's expressive power to effectively filter low/high-frequency signals for graph homophily/heterophily.

Referring now to FIG. 3B, FIG. 3B is a flowchart of non-limiting embodiments or aspects of a process 350 for target label concentration based ordinal encoding. In some non-limiting embodiments or aspects, one or more of the steps of process 350 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3B, at step 352, process 300 includes applying a transformation function to the symmetrically normalized Laplacian matrix for the augmented adjacency matrix to generate a filter. For example, transaction service provider system 108 may apply a transformation function to the symmetrically normalized Laplacian matrix $L_{sym}$ for the augmented adjacency matrix $\tilde{A}$ to generate a filter $\tilde{S}$.

Non-limiting embodiments or aspects of the present disclosure recognize that instead of manually setting the depth d, that the depth d may be built into the model as a trainable parameter so that a proper set of the eigengraph weights matching the graph homophily/heterophily can be automatically reached by finding the optimal d in an end-to-end fashion during training. Differentiable variables need continuity, which requires the extension of depth d from the discrete positive integer domain ($\mathbb{N}+$) to the continuous real number domain $\mathbb{R}$. According to functional calculus, applying an arbitrary function $f$ on a graph Laplacian $L_{sym}$ is equivalent to applying the same function only on the eigenvalue matrix $\Lambda$ as defined according to the following Equation (7):

$$f(L_{sym}) = Uf(\Lambda)U^T = U\begin{bmatrix} f(\lambda_1) & \cdots & 0 \\ \vdots & \ddots & \vdots \\ 0 & \cdots & f(\lambda_n) \end{bmatrix}U^T \qquad (7)$$

which also applies to $\tilde{L}_{sym}$ and $\tilde{S}$. Accordingly, an arbitrary depth SGC may be realized via a power function according to the following Equation (8):

$$f(\tilde{S}) \triangleq \tilde{S}^d = \tilde{U}(I - \tilde{\Lambda})^d\tilde{U}^T = \sum_{i=1}^n (1 - \tilde{\lambda}_i)^d\tilde{u}_i\tilde{u}_i^T (d \in \mathbb{R}) \qquad (8)$$

Figure 5:
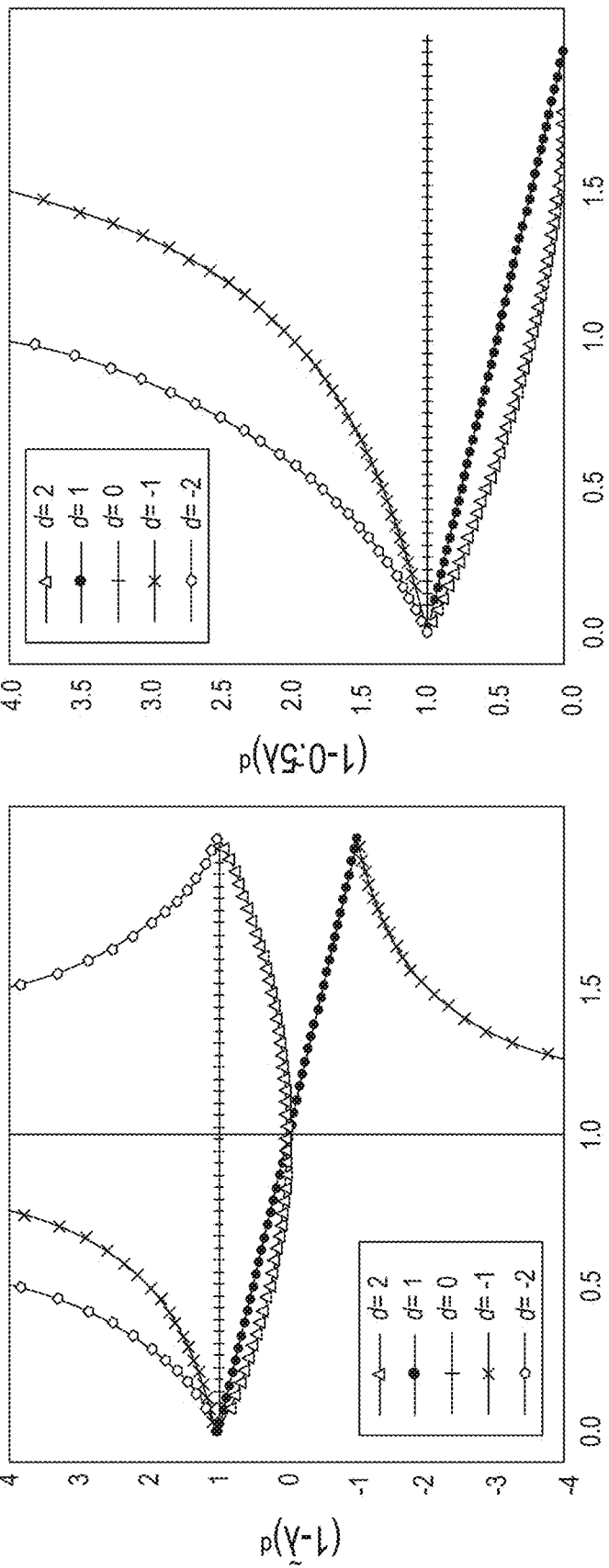
FIG. 5 is graphs showing eigengraph weight versus eigenvalue under different depths for a simplified graph convolutional network (SGC) and non-limiting embodiments or aspects of a graph convolutional network (GCN)

However, since $\tilde{\lambda}_i\in[0, 2)$, $(1-\lambda_i)\leq0$ when $1\leq\hat{\lambda}i<2$, and for $(1-\tilde{\lambda}_i)$ taking zero or negative values, $(1-\tilde{\lambda}_i)^d$ is not well-defined or involves complex-number-based calculations for a real-valued d (e.g., $(-0.5)^{38}$, etc.). Moreover, even for integer-valued ds under which $(1-\tilde{\lambda}_i)^d$ is easy to compute, the behavior of $(1-\tilde{\lambda}_i)^d$ is complicated versus $\tilde{\lambda}_i$ and diverges when $\hat{\lambda}_i=1$ for negative ds, as shown in graph (a) of FIG. 5. Thus, the favored weight distribution may be hard to obtain by tuning d.

As shown in FIG. 3B, at step 354, process 300 includes obtaining the eigenvector matrix and the eigenvalue matrix from the eigendecomposition of the symmetrically normalized Laplacian matrix for the augmented adjacency matrix. For example transaction service provider system 108 may obtain the eigenvector matrix U and the eigenvalue matrix $\Lambda$ from the eigendecomposition of the symmetrically normalized Laplacian matrix $L_{sym}$ for the augmented adjacency matrix $\tilde{A}$.

To avoid such complications and alleviate the difficulties for manipulating the eigengraph weights, a transformation function g($\cdot$) operating on the graph Laplacian $L_{sym}$ or $\tilde{L}_{sym}$ may be used to shift $g(\lambda_i)$ or $g(\tilde{\lambda}_i)$ into a proper value range so that its power of a real-valued d is easy to obtain and well-behaved versus $\lambda_t$ or $\tilde{\lambda}_i$. Without the loss of generality, non-limiting embodiments or aspects of the present disclosure may focus primarily on $L_{sym}$ and $\lambda_i$. There may exist multiple choices for g($\cdot$) satisfying the requirements. Non-limiting embodiments or aspects of the present disclosure may use the following Equation (9):

$$\hat{S} = g(L_{sym}) = \frac{1}{2}(2I - L_{sym}) \tag{9}$$

This choice of g($\cdot$) may hold three properties: (1) Positive eigenvalues. Because of $L_{sym}$'s i-th eigenvalue $\lambda_i \in [0, 2)$, the corresponding eigenvalue of $\tilde{S}$ is $g(\lambda_i) = \frac{1}{2}(2-\lambda_i) \in (0, 1]$. Thus, the d-th power of $g(\lambda_i)$ is computable for any d$\in$R. (2) Monotonicity versus eigenvalues $\lambda$. As shown in graph (b) of FIG. 5, $g(\lambda_i)^d = (1 - \frac{1}{2}\lambda)^d$ is monotonically increasing/decreasing when $\lambda$ varies between 0 and 2 under negative/positive depth. (3) Geometric interpretability. Filter $\hat{S}$ can be expressed according to the following Equation (10):

$$\hat{S} = U\hat{\Lambda}U^T = U\left(I - \frac{1}{2}\Lambda\right)U^T = \frac{1}{2}I + \frac{1}{2}(I - L_{sym}) = \frac{1}{2}\left(I + D^{-\frac{1}{2}}AD^{-\frac{1}{2}}\right) \tag{10}$$

As shown in FIG. 3B, at step 358, process 300 includes setting a trainable depth parameter as a power of each eigenvalue of the eigenvalue matrix of the symmetrically normalized Laplacian matrix to generate a new symmetrically normalized Laplacian matrix. For example, transaction service provider system 108 may set a trainable depth parameter d as a power of each eigenvalue of the eigenvalue matrix $\Lambda$ of the symmetrically normalized Laplacian matrix $L_{sym}$ to generate a new symmetrically normalized Laplacian matrix $S^d$.

Figure 6:
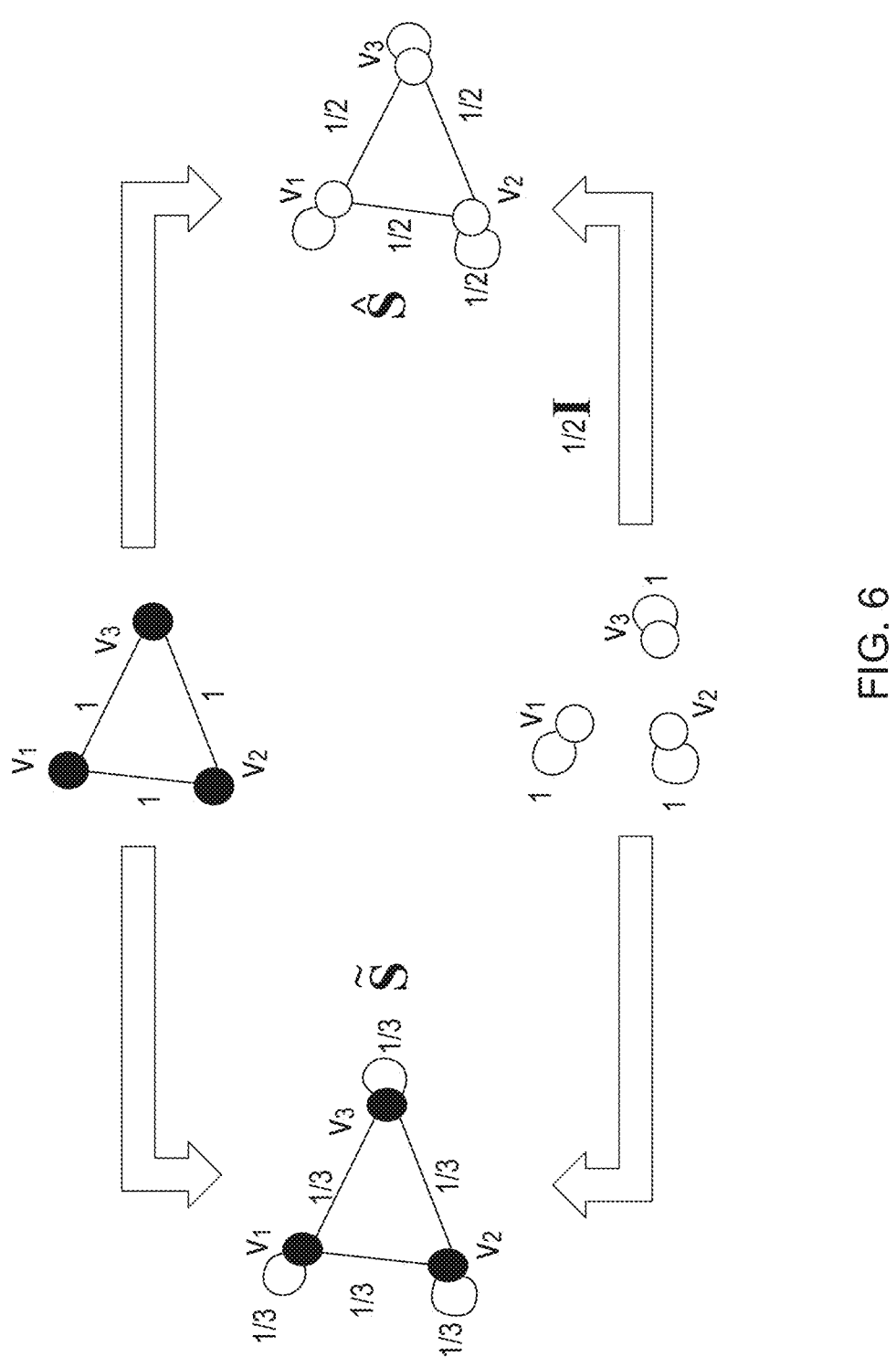
FIG. 6 illustrates a difference between a filter for GCN/SGC and a filter for non-limiting embodiments or aspects of a GCN.

As shown in FIG. 6, in the spatial domain, $\hat{S}$ may be obtained via three operations on adjacency matrix A: normalization, adding self-loops, and scaling all edge weights by ½ (e.g., a type of lazy random walk, etc.), while $\tilde{S}$ in atypical GCN/SGC contains two operations: adding self-loops and normalization.

With the help of transformation g, the depth d is redefined on real number domain, and the message propagation process of depth d can be realized via the following steps: (1) Eigen-decompose $L_{sym}$; (2) Calculate $\hat{S}^d$ via weight $g(\lambda_i)^d$ and the weighted sum of all eigengraphs: $\hat{S}^d = U_\Lambda^{-d}U^T = \Sigma_{i=1}{}^n g(\lambda_i)^d u_i u_i^T$; (3) Multiply $\hat{S}^d$ with original node attributes X.

An intuitive explanation of negative d can be obtained from the perspective of matrix inverse and message diffusion process when d takes integer values. Since $\hat{S}^{-1}\hat{S} = U\hat{\Lambda}^{-1}{}_{U^T}U\hat{\Lambda}1_{U^T} = I$, $\hat{S}^{-1}$ is the inverse matrix of $\hat{S}$. In diffusion dynamics, X can be viewed as an intermediate state generated in a series of message propagation steps. $\hat{S}X$ effectively propagates the message one-step forward, while $\hat{S}^{-1}$ can cancel the effect of $\hat{S}$ on X and recover the original message by moving backward: $\hat{S}$–1$\hat{S}$X=X. Accordingly, $\hat{S}$–1X traces back to the message's previous state in the series. However, neither A or L has inverse due to their non-positive eigenvalues. Non-integer d indicates the back- or forward propagation can be a continuous process.

As shown in FIG. 3B, at step 358, process 300 includes a graph convolution using the filter to generate an output embedding matrix. For example, transaction service provider system 108 may apply a graph convolution using the filter $\hat{S}^d$ to generate an output embedding matrix H.

In some non-limiting embodiments or aspects, by further making da trainable parameter, non-limiting embodiments or aspects of the present disclosure may provide a Redefined Depth-GCN-Single (RED-GCN-S), whose final node embedding matrix may be given according to the following Equation (11):

$$H = \sigma\left(\hat{S}^d XW\right) \tag{11}$$

where $\sigma(\cdot)$ is the nonlinear activation function; W is a trainable parameter matrix; and d is the trainable depth parameter. For example, the graph convolution may be applied according to Equation (11). As shown in graph (b) of FIG. 5, weight distribution of different frequencies/eigengraphs may be tuned via d: (1) for d=0, the weight is uniformed distributed among all frequency components $(g(\lambda_i)^d = 1)$, which implies that no particular frequency is preferred by the graph signal; (2) for d>0, weight $g(\lambda_i)^d$ decreases with the corresponding frequency, which indicates the low frequency components are favored so that RED-GCN-S effectively functions as a low-pass filter and therefore captures graph homophily; (3) for d<0, high frequency components gains amplified weights so that RED-GCN-S serves as a high-pass filter capturing graph heterophily. During training, RED-GCN-S may tune its frequency filtering functionality to suit the underlying graph signal by automatically finding the optimal d.

During optimization, RED-GCN-S embraces a single depth d unified for all eigen-graphs and selects its preferences for either homophily or heterophily. However, RED-GCN-S may use a full eigen-decomposition of $L_{sym}$, which can be expensive for large graphs. Additionally, the high and low frequency components in a graph signal may not be mutually exclusive, namely, there exists the possibility for a graph to simultaneously possess homophilic and heterophilic counterparts. Therefore, non-limiting embodiments or aspects of the present disclosure may provide a further variant of RED-GCN: RED-GCN-D (Dual), which introduces two separate trainable depths, a first trainable depth parameter $d_h$ and a second trainable depth parameter $d_l$, to gain more flexible weighting of the high and low frequency related eigengraphs respectively. The Arnoldi method may be adopted to conduct EVD on $L_{sym}$ and obtain the top-K largest and smallest eigen-pairs $(\lambda_i, u_i)$s. By denoting $U_l = U$[:, 0: K] and $U_h = U$[:, n–K: n]($U_l$ and $U_h \in \mathbb{R}^{n \times K}$), non-limiting embodiments or aspects of the present disclosure may define a new diffusion matrix $\hat{S}_{dual}(d_l, d_h, K)$ according to the following Equation (12):

$$\hat{S}_{dual}(d_l, d_h, K) = U_l \hat{\Lambda}_l^{d_l} U_l^T + U_h \hat{\Lambda}_h^{d_h} U_h^T \tag{12}$$

where $\Lambda_l \in \mathbb{R}^{K \times K}$ and $\Lambda_h \in \mathbb{R}^{K \times K}$ are diagonal matrices of the top-K smallest and largest eigenvalues, where K is a hyperparameter. The case $\lambda_i = 2$, namely $g(\lambda_i) = 0$, may be excluded since it corresponds to the existence of bipartite components. The final node embedding of RED-GCN-D may be defined according to the following Equation (13):

$$H = \sigma\left(\hat{S}_{dual}(d_l, d_h, K)XW\right) \tag{13}$$

where depths $d_l$ and $d_h$ are trainable; and W is a trainable parameter matrix. RED-GCN-D may be scalable on large graphs by choosing K<<n, so that $\hat{S}_{dual}(d_l, d_h, K)$ approximates$_2$ the full diffusion matrix by covering only a small subset of all eigengraphs. For small graphs, $K=\lfloor n/2 \rfloor$ may be used to include all eigengraphs, and $\hat{S}_{dual}(d_l, d_h, K)$ may thus gains higher flexibility than S with the help of the two separate depth parameters instead of a unified one.

Non-limiting embodiments or aspects of the present disclosure may provide various differences with ODE-based GNNs. Previous attempts on GNNs with continuous diffusion are mostly inspired by a graph diffusion equation, an Ordinary Difference Equation (ODE) characterizing the dynamical message propagation process versus time. In contrast, non-limiting embodiments or aspects of the present disclosure may start from discrete graph convolution operations without explicitly involving ODE. Crystal graph neural network (CGNN) aims to build a deep GNN immune to over-smoothing by adopting the neural ordinary differential equation (ODE) framework, but its time parameter t is a non-trainable hyper-parameter predefined within the positive domain, which is a difference with $R_ED$-GCN. A CGNN component for preventing over-smoothing, restart distribution (e.g., the skip connection from the first layer, etc.), is not needed in non-limiting embodiments or aspects of the present disclosure. Moreover, CGNN applies the same depth to all frequency components, while $R_ED$-GCN-D has the flexibility to adopt two different depths respectively to be adaptive to high and low frequency components. Graph neural definition (GRAND) introduces non-Eular multi-step schemes with adaptive step size to obtain more precise solutions of the diffusion equation, and its depth (total integration time) is continuous but still predefined/non-trainable and takes only positive values. Decoupled graph convolution (DGC) decouples the SGC depth into two predefined non-trainable hyper-parameters: a positive real-valued T controlling the total time and a positive integer-valued $K_{dgc}$ corresponding to the number of diffusion steps. However, realizing negative depth in DGC is non-applicable since the implementation is through propagation by $K_{dgc}$ times, rather than through an arbitrary real-valued exponent d on eigengraph weights in RED-GCN.

As shown in FIG. 3A, at step 302, process 300 includes processing, using a machine learning classifier, the output embedding matrix to generate at least one predicted label for at least one node of the graph. For example, transaction service provider system 108 may process, using a machine learning classifier, the output embedding matrix H to generate at least one predicted label for at least one node of the graph G. As an example, the graph G may include a plurality of edges and a plurality of nodes for the plurality of edges, the plurality of nodes may be associated with a plurality of accounts in an electronic payment network, and/or the plurality of edges may be associated with a plurality of transactions between the plurality of accounts in the electronic payment network. In such an example, the at least one predicted label for the at least one node of the graph G includes a prediction of whether at least one account associated with the at least one node is a malicious account (e.g., a money mule, etc.).

Example Experiment

In this section, non-limiting embodiments or aspects of RED-GCN are evaluated on a semi-supervised node classification task on both homophilic graphs and heterophilic graphs.

Eleven datasets are used for evaluation, including four homophilic graphs: Cora, Citeseer, Pubmed, and DBLP, and seven heterophilic graphs: Cornell, Texas, Wisconsin, Actor, Chameleon, Squirrel, and cornell5. All datasets are collected from the public GCN platform Pytorch-Geometric. For Cora, Citeseer, and Pubmed with data splits in Pytorch-Geometric, the training/validation/testing set split is kept as in GCN. For the remaining eight datasets, each dataset is randomly split into 20/20/60% for training, validation, and testing.

Non-limiting embodiments or aspects of RED-GCN are compared with seven baseline methods, including four classic GNNs: GCN, SGC, APPNP, and ChebNet, and three GNNs tailored for heterophilic graphs: FAGCN, GPRGNN, and H2GCN. Accuracy (ACC) is used as the evaluation metric. The average ACCs are reported with the standard deviation (std) for all methods, each obtained by five runs with different initializations.

The semi-supervised node classification performances on homophilic graphs and heterophilic graphs are shown in Table 1 and Table 2, respectively, of FIG. 7.

From Table 1, it is observed that different methods have similar performance on homophilic graphs. $R_ED$-GCN-S achieves the best accuracies on two datasets: Cora and DBLP. On the remaining two datasets, $R_ED$-GCN-S is only 1.1% and 0.4% below the best baselines (APPNP on Citeseer and SGC on Pubmed). For $R_ED$-GCN-D, $R_ED$-GCN-D obtains similar performance as the other methods, even though $R_ED$-GCN-D only uses the top-Klargest/smallest eigen-pairs.

$R_ED$-GCN-S/$R_ED$-GCN-D outperforms every baseline on all heterophilic graphs, as shown in Table 2. These results demonstrate that without manually setting the model depth and without the prior knowledge of the input graph, $R_ED$-GCN has the capability of automatically detecting the underlying graph heterophily. On three large datasets, Squirrel, Chameleon, and cornell5, even with only a small portion of the eigengraphs, $R_ED$-GCN-D is able to achieve better performance than $R_ED$-GCN-S with the complete set of eigengraphs. This suggests that the graph signal in some real-world graphs might be dominated by a few low and high frequency components, and allowing two independent depth parameters in $R_ED$-GCN-D brings the flexibility to capture the low and high frequencies at the same time.

A systematic study is also conducted on the node classification performance with respect to the trainable depth d.

Figure 8:
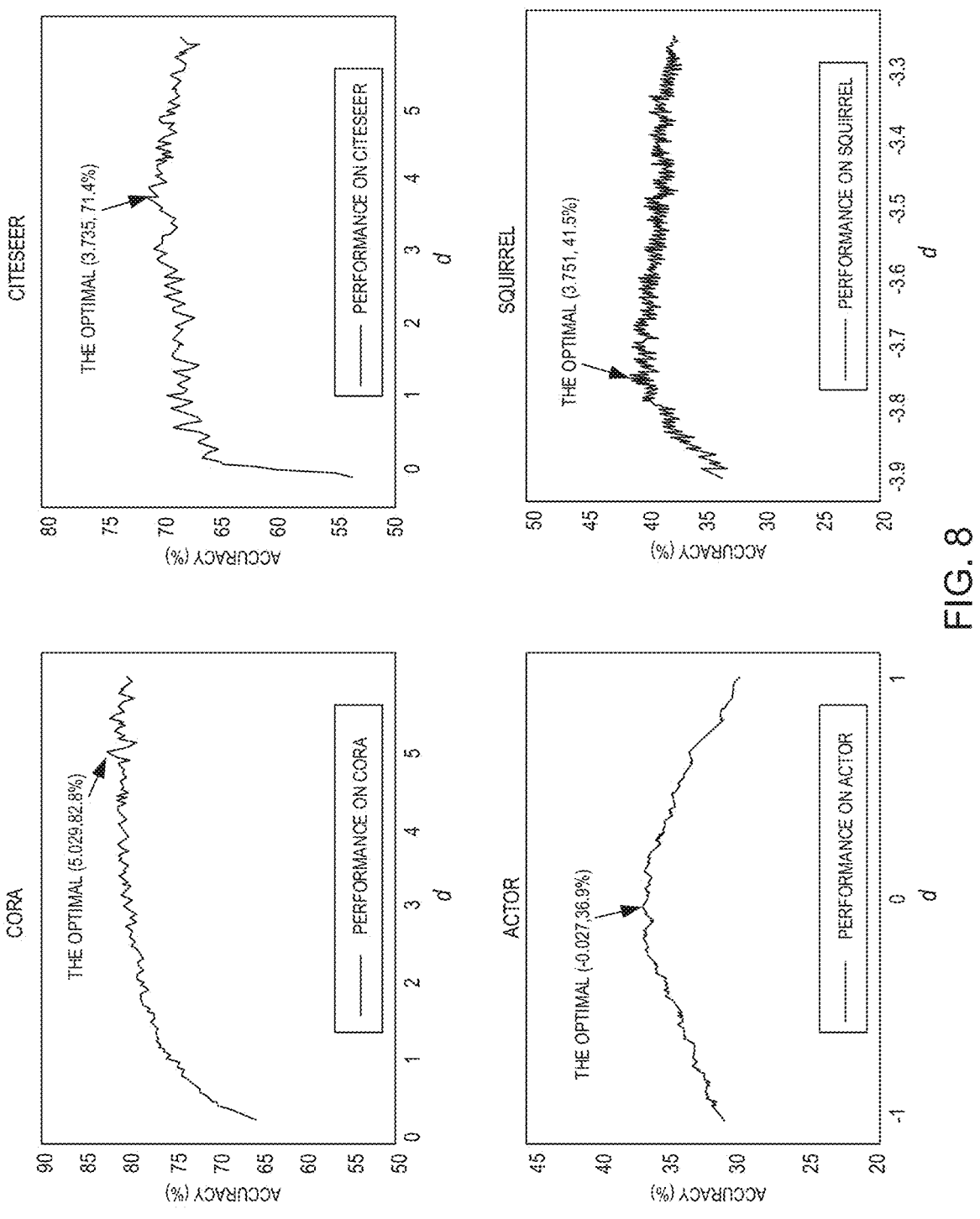
FIG. 8 is graphs showing node classification accuracy of non-limiting embodiments or aspects of a GCN with respect to a trainable depth parameter on example datasets.

As shown in FIG. 8, the optimal depths and their corresponding classification accuracies are annotated. For two homophilic graphs, Cora and Citeseer, the optimal depths are positive (5.029 and 3.735) in terms of the best ACCs, while for two heterophilic graphs, Actor and Squirrel, the optimal depths are negative (−0.027 and −3.751). These results demonstrate non-limiting embodiments or aspects of the present disclosure indeed automatically capture graph heterophily/homophily by finding the suitable depth to suppress or amplify the relative weights of the corresponding frequency components. Namely, high/low frequency components are suppressed for homophilic/heterophilic graphs, respectively.

For the two homophilic graphs in graphs (a) and (b) of FIG. 8, sharp performance drop is observed when depth d approaches 0, because the eigengraphs gain close-to-uniform weights. For the heterophilic Actor dataset, its optimal depth −0.027 is close to 0, as shown in graph (c) of FIG. 8. In addition, the performance of $R_ED$-GCN-D (27.6%) is similar to that of GCN (27.5%), both of which are much worse than $R_ED$-GCN-S (35.3%). This result indicates that Actor is a special graph where all frequency components have similar importance. Due to the absence of the intermediate frequency components between the high- and low-end ones, the performance of $R_ED$-GCN-D is severely impacted. For conventional GCN, the suppressed weights of the high frequency components deviate from the near-uniform spectrum and thus lead to low ACC on this dataset.

It is especially interesting to analyze what change a negative depth brings to the spatial domain and how such change impacts the subsequent model performance.

Figure 10:
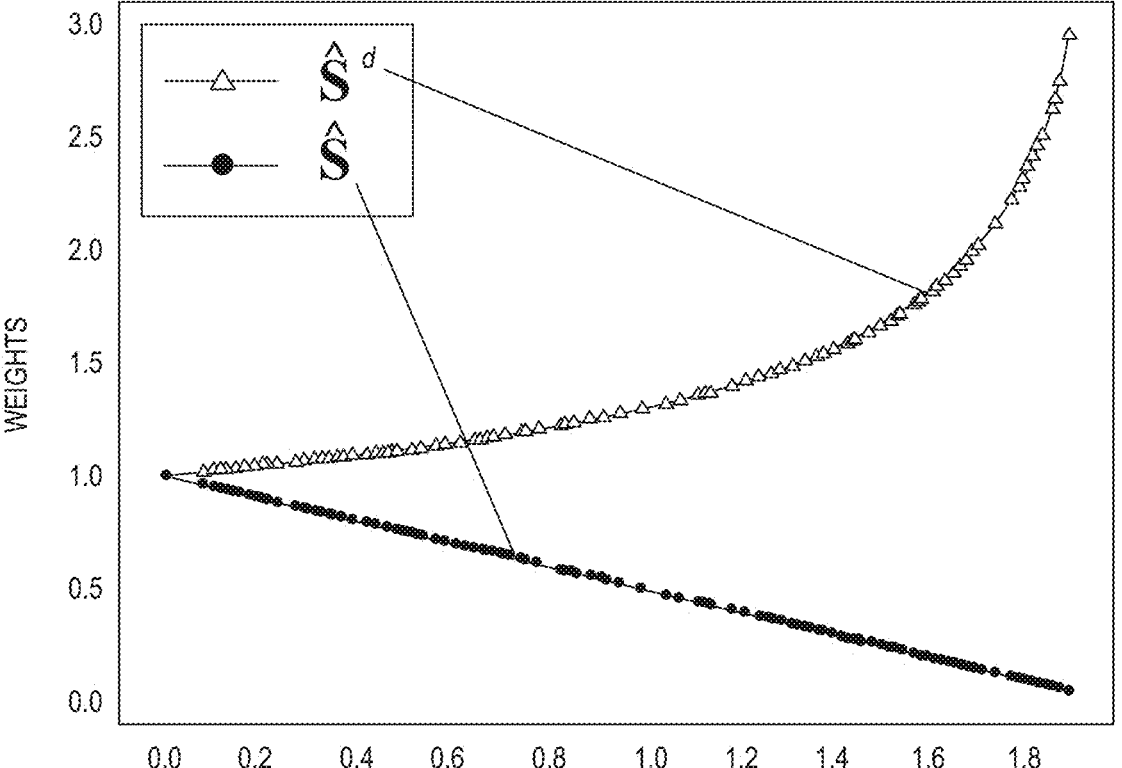
FIG. 10 is a graph showing weights of eigengraphs with respect to eigenvalues on an augmented diffusion matrix and an original diffusion matrix for an example dataset.

Graph augmentation. By picking the optimal depth d according to the best performance on the validation set, a new diffusion matrix $\hat{S}^d$ is obtained. With the optimal d fixed, substituting the normalized adjacency matrix $$D^{-\frac{1}{2}}\tilde{A}D^{-\frac{1}{2}}$$

in Equation (1) by $\hat{S}^d$ is equivalent to applying the conventional GCN to a new topology. This topology effectively plays the role of a structural augmentation for the original graph. The impact of such augmentation on performance is tested on three heterophilic graphs: Texas, Cornell and Wisconsin, as shown in the table of FIG. 9. Apparently, for the conventional GCN, the performance obtained with this new topology is superior over that with the raw input graph: it dramatically brings 20%-30% lifts in ACC. Moreover, the augmented topologies also make conventional GCN outperform $R_ED$-GCN-S and $R_ED$-GCN-D on two out of the three datasets. By nature, the augmented graph is a re-weighted linear combination of the eigengraphs, and its topological structure intrinsically assigns higher weights to eigengraphs corresponding to higher frequencies, as shown FIG. 10.

Figure 11:
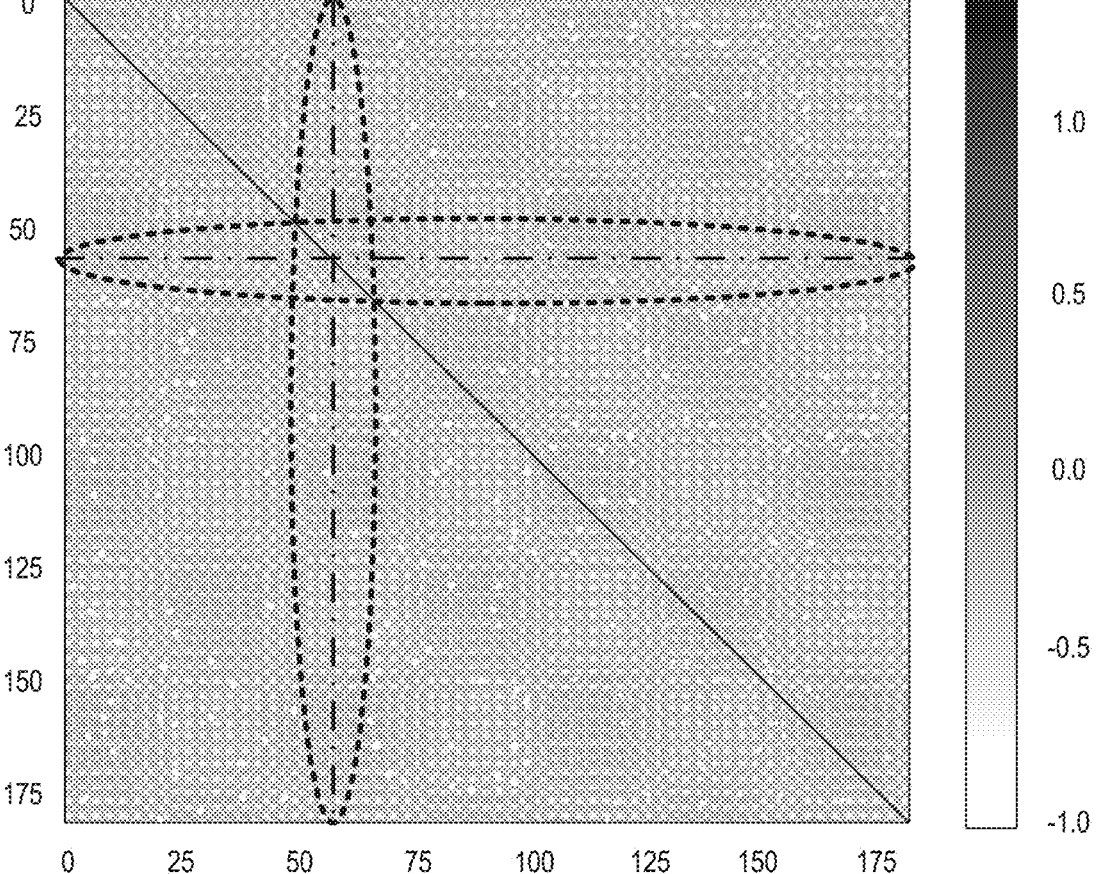
FIG. 11 is a heat map showing a difference between an augmented diffusion matrix and an original diffusion matrix for an example data set.

To further understand how the topology of $\hat{S}^d$ with a negative optimal d differs from that of $\hat{S}$ and why the performance is significantly boosted, a heat map of $(\hat{S}^d-\hat{S})$ is presented in FIG. 11 for the Cornell dataset. First, the dark diagonal line in the heat map indicates the weights of self-loops are significantly strengthened in the augmented graph, and as a result, in consistency with the previous findings, the raw node attributes make more contributions in determining their labels. These strengthened self-weights also play the similar role as restart distribution or skip connections preventing the node embeddings becoming over-smoothed. In addition, there is a horizontal line and a vertical line (light line marked by dashed ovals) in the heat map in FIG. 11 that correspond to the hub node in the graph, namely the node with the largest degree. Interestingly, the connections between this node and most other nodes in the graph experience a negative weight change. Therefore, the influence of the hub node on most other nodes is systematically reduced. Consequently, the augmentation amplifies the deviations between node embeddings and facilitates the characterization of graph heterophily.

Accordingly, non-limiting embodiments or aspects of the present disclosure may provide depth trainable GCN by redefining GCN on the real number domain and unveil an interdependence between negative GCN depth and graph heterophily. A novel problem of automatic GCN depth tuning for graph homophily/heterophily detection is formulated, and non-limiting embodiments or aspects of the present disclosure provide a simple and powerful solution, $R_ED$-GCN, with two variants $R_ED$-GCN-S and $R_ED$-GCN-D. An effective graph augmentation method is also enabled by a new understanding of the message propagation mechanism generated by the negative depth. Superior performance of non-limiting embodiments or aspects of the present disclosure is demonstrated by example experiments with semi-supervised node classification on eleven graph datasets. Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:

obtaining, with at least one processor, a graph G including an adjacency matrix A and an attribute matrix X, wherein the graph G includes a plurality of edges and a plurality of nodes for the plurality of edges, wherein the plurality of nodes is associated with a plurality of accounts in an electronic payment network, wherein the plurality of edges is associated with a plurality of transactions between the plurality of accounts in the electronic payment network, wherein an augmented adjacency matrix Ã is determined based on the adjacency matrix A and an identity matrix I, wherein a symmetrically normalized Laplacian matrix $L_{sym}$ for the augmented adjacency matrix Ã is determined based on the augmented adjacency matrix Ã, the identity matrix I, and a degree matrix D of the adjacency matrix A, and wherein an eigendecomposition of the symmetrically normalized Laplacian matrix $L_{sym}$ for the augmented adjacency matrix Ã provides an eigenvector matrix U and an eigenvalue matrix $\wedge$;

training, with the at least one processor, a graph convolutional network, by:

applying, with the at least one processor, a transformation function to the symmetrically normalized Laplacian matrix $L_{sym}$ for the augmented adjacency matrix Ã to generate a filter $\hat{S}$;

obtaining, with the at least one processor, the eigenvector matrix U and the eigenvalue matrix $\wedge$ from the eigendecomposition of the symmetrically normalized Laplacian matrix $L_{sym}$ for the augmented adjacency matrix Ã, setting, with the at least one processor, a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$;

determining, with the at least one processor, a plurality of eigengraph weights corresponding to eigenvalues of the symmetrically normalized Laplacian matrix $L_{sym}$, wherein each eigengraph weight is based on a coefficient for an eigenvalue $\lambda_i$ of the eigenvalue matrix $\wedge$;

adjusting, with the at least one processor, the trainable depth parameter d during training of the graph convolutional network based on the plurality of eigengraph weights to tune the plurality of eigengraph weights to correspond to a homophilic property or a heterophilic property of the graph G, wherein the graph convolutional network automatically identifies a value for the trainable depth parameter d suitable for an underlying graph signal of the graph G;

updating, with the at least one processor, a trainable weight matrix W during training of the graph convolutional network in an end-to-end fashion together with the trainable depth parameter d; and generating, with the at least one processor, an output embedding matrix H, by applying a nonlinear activation function $\sigma(\cdot)$ to a result generated based on the filter $\hat{S}$, the trainable depth parameter d, the attribute matrix X, and the trainable weight matrix W;

processing, with the at least one processor, using a machine learning classifier, the output embedding matrix H to generate at least one predicted label for at least one node of the graph G, wherein the at least one predicted label for the at least one node of the graph G includes a prediction of whether at least one account associated with the at least one node is a malicious account; and authorizing or denying, with the at least one processor, based on the at least one predicted label, at least one transaction associated with the at least one account in the electronic payment network.

2. The method of claim 1, wherein the output embedding matrix H is generated according to the following updating Equation:

$$H=\sigma(\hat{S}^d XW)$$

where H is the output embedding matrix, $\sigma(\cdot)$ is the nonlinear activation function, $\hat{S}$ is the filter, X is the attribute matrix, W is the trainable weight matrix, and d is the trainable depth parameter.

3. The method of claim 1, wherein the trainable depth parameter d includes a first trainable depth parameter $d_h$ and a second trainable depth parameter $d_l$, and wherein the output embedding matrix H is generated according to the following updating Equation:

$$H=\sigma(\hat{S}_{dual}(d_l,d_h,K)XW)$$

where H is the output embedding matrix, $\sigma(\cdot)$ is the nonlinear activation function, $\hat{S}$ is the filter, X is the attribute matrix, W is the trainable weight matrix, and K is a hyperparameter.

4. A system, comprising:

at least one processor programmed and/or configured to:

obtain a graph G including an adjacency matrix A and an attribute matrix X, wherein the graph G includes a plurality of edges and a plurality of nodes for the plurality of edges, wherein the plurality of nodes is associated with a plurality of accounts in an electronic payment network, wherein the plurality of edges is associated with a plurality of transactions between the plurality of accounts in the electronic payment network, wherein an augmented adjacency matrix $\tilde{A}$ is determined based on the adjacency matrix A and an identity matrix I, wherein a symmetrically normalized Laplacian matrix $L_{sym}$ for the augmented adjacency matrix $\tilde{A}$ is determined based on the augmented adjacency matrix $\tilde{A}$, the identity matrix I, and a degree matrix D of the adjacency matrix A, and wherein an eigendecomposition of the symmetrically normalized Laplacian matrix $L_{sym}$ for the augmented adjacency matrix $\tilde{A}$ provides an eigenvector matrix U and an eigenvalue matrix $\wedge$; and train a graph convolutional network, by:

applying a transformation function to the symmetrically normalized Laplacian matrix $L_{sym}$ for the augmented adjacency matrix $\tilde{A}$ to generate a filter $\hat{S}$;

obtaining the eigenvector matrix U and the eigenvalue matrix $\wedge$ from the eigendecomposition of the symmetrically normalized Laplacian matrix $L_{sym}$ for the augmented adjacency matrix $\tilde{A}$;

setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$;

determining a plurality of eigengraph weights corresponding to eigenvalues of the symmetrically normalized Laplacian matrix $L_{sym}$, wherein each eigengraph weight is based on a coefficient for an eigenvalue $\lambda_i$ of the eigenvalue matrix $\wedge$;

adjusting the trainable depth parameter d during training of the graph convolutional network based on the plurality of eigengraph weights to tune the plurality of eigengraph weights to correspond to a homophilic property or a heterophilic property of the graph G, wherein the graph convolutional network automatically identifies a value for the trainable depth parameter d suitable for an underlying graph signal of the graph G;

updating a trainable weight matrix W during training of the graph convolutional network in an end-to-end fashion together with the trainable depth parameter d; and generating an output embedding matrix H, by applying a nonlinear activation function $\sigma(\cdot)$ to a result generated based on the filter $\hat{S}$, the trainable depth parameter d, the attribute matrix X, and the trainable weight matrix W:

process, using a machine learning classifier, the output embedding matrix H to generate at least one predicted label for at least one node of the graph G, wherein the at least one predicted label for the at least one node of the graph G includes a prediction of whether at least one account associated with the at least one node is a malicious account; and authorize or deny, based on the at least one predicted label, at least one transaction associated with the at least one account in the electronic payment network.

5. The system of claim 4, wherein the output embedding matrix H is generated according to the following updating Equation:

$$H=\sigma(\hat{S}^d XW)$$

where H is the output embedding matrix, $\sigma(\cdot)$ is the nonlinear activation function, $\hat{S}$ is the filter, X is the attribute matrix, W is the trainable weight matrix, and d is the trainable depth parameter.

6. The system of claim 4, wherein the trainable depth parameter d includes a first trainable depth parameter $d_h$ and a second trainable depth parameter $d_l$, and wherein the output embedding matrix H is generated according to the following updating Equation:

$$H=\sigma(\hat{S}_{dual}(d_l,d_h,K)XW)$$

where H is the output embedding matrix, σ(•) is the nonlinear activation function, Ŝ is the filter, X is the attribute matrix, W is the trainable weight matrix, and K is a hyperparameter.

7. A computer program product including a non-transitory computer readable medium including program instructions which, when executed by at least one processor, cause the at least one processor to:

obtain a graph G including an adjacency matrix A and an attribute matrix X, wherein the graph G includes a plurality of edges and a plurality of nodes for the plurality of edges, wherein the plurality of nodes is associated with a plurality of accounts in an electronic payment network, wherein the plurality of edges is associated with a plurality of transactions between the plurality of accounts in the electronic payment network, wherein an augmented adjacency matrix Ã is determined based on the adjacency matrix A and an identity matrix I, wherein a symmetrically normalized Laplacian matrix $L_{sym}$ for the augmented adjacency matrix Ã is determined based on the augmented adjacency matrix Ã, the identity matrix I, and a degree matrix D of the adjacency matrix A, and wherein an eigendecomposition of the symmetrically normalized Laplacian matrix $L_{sym}$ for the augmented adjacency matrix Ã provides an eigenvector matrix U and an eigenvalue matrix $\wedge$; and train a graph convolutional network, by:

applying a transformation function to the symmetrically normalized Laplacian matrix $L_{sym}$ for the augmented adjacency matrix Ã to generate a filter Ŝ;

obtaining the eigenvector matrix U and the eigenvalue matrix $\wedge$ from the eigendecomposition of the symmetrically normalized Laplacian matrix $L_{sym}$ for the augmented adjacency matrix Ã;

setting a trainable depth parameter d as a power of each eigenvalue of the eigenvalue matrix $\wedge$ of the symmetrically normalized Laplacian matrix $L_{sym}$ to generate a new symmetrically normalized Laplacian matrix $S^d$;

determining, with the at least one processor, a plurality of eigengraph weights corresponding to eigenvalues of the symmetrically normalized Laplacian matrix $L_{sym}$, wherein each eigengraph weight is based on a coefficient for an eigenvalue $\lambda_i$ of the eigenvalue matrix $\wedge$;

adjusting, with the at least one processor, the trainable depth parameter d during training of the graph convolutional network based on the plurality of eigengraph weights to tune the plurality of eigengraph weights to correspond to a homophilic property or a heterophilic property of the graph G, wherein the graph convolutional network automatically identifies a value for the trainable depth parameter d suitable for an underlying graph signal of the graph G;

updating, with the at least one processor, a trainable weight matrix W during training of the graph convolutional network in an end-to-end fashion together with the trainable depth parameter d; and generating an output embedding matrix H, by applying a nonlinear activation function σ(•) to a result generated based on the filter Ŝ, the trainable depth parameter d, the attribute matrix X, and the trainable weight matrix W;

process, using a machine learning classifier, the output embedding matrix H to generate at least one predicted label for at least one node of the graph G, wherein the at least one predicted label for the at least one node of the graph G includes a prediction of whether at least one account associated with the at least one node is a malicious account; and authorize or deny, based on the at least one predicted label, at least one transaction associated with the at least one account in the electronic payment network.

8. The computer program product of claim 7, wherein the output embedding matrix H is generated according to the following updating Equation:

$$H=\sigma(\hat{S}^d XW)$$

where H is the output embedding matrix, σ(•) is the nonlinear activation function, Ŝ is the filter, X is the attribute matrix, W is the trainable weight matrix, and d is the trainable depth parameter.

9. The computer program product of claim 7, wherein the trainable depth parameter d includes a first trainable depth parameter $d_l$, and a second trainable depth parameter $d_l$, and wherein the output embedding matrix H is generated according to the following updating Equation:

$$H=\sigma(\hat{S}_{dual}(d_l,d_h,K)XW)$$

where H is the output embedding matrix, σ(•) is the nonlinear activation function, Ŝ is the filter, X is the attribute matrix, W is the trainable weight matrix, and K is a hyperparameter.

* * * * *